(12) United States Patent
Fu

(10) Patent No.: US 12,238,234 B2
(45) Date of Patent: Feb. 25, 2025

(54) AIR OUTLET SUPPORT

(71) Applicant: Hainan Xunwei Technology Co., Ltd., Hainan (CN)

(72) Inventor: Gonghai Fu, Hainan (CN)

(73) Assignee: Hainan Xunwei Technology Co., Ltd., Haikou (CN)

( * ) Notice: Subject to any disclaimer, the term of this patent is extended or adjusted under 35 U.S.C. 154(b) by 0 days.

(21) Appl. No.: 18/679,443

(22) Filed: May 30, 2024

(65) Prior Publication Data
US 2024/0406302 A1 Dec. 5, 2024

(30) Foreign Application Priority Data
Jun. 1, 2023 (CN) .......................... 202321411252.4

(51) Int. Cl.
*H04M 1/00* (2006.01)
*H04M 1/04* (2006.01)
*B60R 11/00* (2006.01)
*B60R 11/02* (2006.01)

(52) U.S. Cl.
CPC ....... *H04M 1/04* (2013.01); *B60R 2011/0008* (2013.01); *B60R 11/0241* (2013.01)

(58) Field of Classification Search
CPC ................. H04M 1/04; B60R 11/0241; B60R 2011/0008
See application file for complete search history.

(56) References Cited

U.S. PATENT DOCUMENTS

| 5,979,724 A * | 11/1999 | Loewenthal, Jr. .. B60R 11/0241 224/560 |
| 11,400,866 B1 * | 8/2022 | Xu .......................... B60R 11/00 |
| 11,820,293 B2 * | 11/2023 | Chen ....................... B60R 11/02 |
| 2014/0103087 A1 * | 4/2014 | Fan ......................... B60R 11/02 224/544 |
| 2019/0241129 A1 * | 8/2019 | Song ................... B60R 11/0241 |

* cited by examiner

*Primary Examiner* — Pakee Fang
(74) *Attorney, Agent, or Firm* — Westbridge IP LLC

(57) ABSTRACT

The present disclosure provides an air outlet support mountable to an air conditioner of an automobile, belonging to the technical field of fixing supports for vehicle-mounted electronic devices. The air outlet support includes a first housing, a second housing, a snapping part, and a rotating part. The second housing is connected to the first housing, and has a first through hole; the snapping part penetrates through the first through hole and has a first bent portion; and the rotating part is rotatably arranged between the first housing and the second housing, and is movably connected to the snapping part. When the rotating part rotates, the snapping part is displaced along an axial direction of the rotating part, and the first housing and the second housing are configured to limit displacement of the rotating part in the axial direction of the rotating part.

19 Claims, 17 Drawing Sheets

AIR OUTLET SUPPORT

CROSS-REFERENCE TO RELATED APPLICATIONS

The present disclosure claims priority to Chinese Patent Application No. 2023214112524 filed on Jun. 1, 2023 with the Chinese Patent Office, and entitled "Air Outlet Support", the contents of which are incorporated herein by reference in entirety for all purposes.

TECHNICAL FIELD

The present disclosure relates to the technical field of fixing supports for vehicle-mounted electronic devices, and in particular to an air outlet support mountable to an air conditioner of an automobile.

BACKGROUND ART

People have gradually higher material standard of living along with the development of society. Automobiles have become the most universal transportation tool for life. The industry of automobile supplies has also emerged. An air outlet support is one of various automobile supplies. The air outlet support is mainly used for fixing a mobile phone, so that an automobile driver can access all the functions of the mobile phone easily, and carry out easily various operations such as GPS navigation, playing popular media or music and making hands-free calls.

However, the air outlet supports in the prior art are mostly clamped and fixed on grilles of the air outlet of the air conditioner of the automobile by a clamp, and when the mobile phone carried by the air outlet support is too heavy, the air outlet support tends to shake or fall off the grille, which has the problems of inconvenience in use and relatively poor stability and safety.

SUMMARY

In view of this, the present disclosure aims at providing an air outlet support to overcome the shortcomings in the prior art.

In order to solve the above technical problems, the present disclosure provides:
an air outlet support mountable to an air conditioner of an automobile, including:
a first housing;
a second housing, connected to the first housing, and having a first through hole;
a snapping part, penetrating through the first through hole, and having a first bent portion; and
a rotating part, rotatably arranged between the first housing and the second housing, and movably connected to the snapping part, wherein when the rotating part rotates, the snapping part is displaced along an axial direction of the rotating part, and the first housing and the second housing are configured to limit the rotating part from displacing in the axial direction of the rotating part.

In addition, the air outlet support according to the present disclosure further may have the following technical features.

In some embodiments of the present disclosure, the first housing includes a first sub-first housing and a second sub-first housing, the first sub-first housing has a first connecting part, the second sub-first housing is connected to the second housing, and the rotating part is rotatably provided between the second sub-first housing and the second housing.

In some embodiments of the present disclosure, the first housing and the second housing form an accommodating space, and the rotating part is rotatably provided in the accommodating space.

In some embodiments of the present disclosure, the first housing has a first groove, the rotating part has a first protrusion, and the first protrusion is rotatably provided in the first groove.

In some embodiments of the present disclosure, the rotating part includes a first rotating portion and a second rotating portion, a radial distance of the first rotating portion is greater than that of the second rotating portion, the second rotating portion has an external thread, the snapping part has second grooves or second through holes, and the external thread is movably connected to the second grooves or the second through holes.

In some embodiments of the present disclosure, a direction of the second grooves or the second through holes at a movable joint is consistent or substantially consistent with a rotation direction of the external thread at the movable joint.

In some embodiments of the present disclosure, the second rotating portion is provided above the snapping part or the second rotating portion is provided below the snapping part.

In some embodiments of the present disclosure, a side of the second housing facing the first housing is provided with a supporting portion, for supporting the snapping part.

In some embodiments of the present disclosure, the snapping part has at least one limiting portion on a side facing the supporting portion between the first housing and the second housing.

In some embodiments of the present disclosure, the second rotating portion extends into the first through hole.

In some embodiments of the present disclosure, the rotating part includes a first rotating part and a second rotating part, the first rotating part has the first rotating portion, the second rotating part has the second rotating portion, and the first rotating part is detachably connected to the second rotating part.

In some embodiments of the present disclosure, the first rotating part is snapped with the second rotating part.

In some embodiments of the present disclosure, a direction of the second grooves or the second through holes at the movable joint is consistent or substantially consistent with a rotation direction of the external thread at the movable joint.

In some embodiments of the present disclosure, the second rotating part is provided above the snapping part or the second rotating part is provided below the snapping part.

In some embodiments of the present disclosure, a side of the second housing facing the first housing is provided with a supporting portion, for supporting the snapping part.

In some embodiments of the present disclosure, the snapping part has at least one limiting portion on a side facing the supporting portion between the first housing and the second housing.

In some embodiments of the present disclosure, the snapping part is rotatably connected to the rotating part.

In some embodiments of the present disclosure, an end of the snapping part facing the rotating part has a first threaded portion, the rotating part has a second threaded portion, and the first threaded portion is rotatably connected to the second threaded portion.

In some embodiments of the present disclosure, the first threaded portion is an external thread, and the second threaded portion is an internal thread.

In some embodiments of the present disclosure, the snapping part has a first snapping part and a second snapping part, the first snapping part has the first threaded portion, the second snapping part has the first bent portion, and the second snapping part or the first snapping part passes through the first through hole.

In some embodiments of the present disclosure, the second snapping part passes through the first through hole, the first snapping part has a third groove or a third through hole along the axial direction of the rotating part, and the second snapping part extends into the third groove or the third through hole to be connected to the first snapping part.

In some embodiments of the present disclosure, the air outlet support further includes a fixing part, the first snapping part has a fourth groove or a fourth through hole along a radial direction of the rotating part, the fourth groove or the fourth through hole is in communication with the third groove or the third through hole, and the fixing part is configured to be connected to the second snapping part through the fourth groove or the fourth through hole.

In some embodiments of the present disclosure, the second snapping part has a fifth groove or a fifth through hole, and the fixing part extends into the fifth groove or the fifth through hole.

In some embodiments of the present disclosure, the rotating part has a sixth through hole, and a connecting portion of the first housing and the second housing is partially or completely accommodated in the sixth through hole.

In some embodiments of the present disclosure, an end of the first housing facing the second housing extends into the sixth through hole.

In some embodiments of the present disclosure, the second housing has a sixth groove, and an end of the rotating part facing the second housing is accommodated in the sixth groove.

In some embodiments of the present disclosure, the second housing has at least one second protrusion at an end away from the first housing.

In some embodiments of the present disclosure, the first housing and/or the second housing has at least one seventh groove.

In some embodiments of the present disclosure, the air outlet support further includes a first locking assembly, the first housing has a first fixing portion, the rotating part has a second fixing portion, and in a locking state, the first locking assembly is located between the first fixing portion and the second fixing portion, for limiting the rotating part from moving relatively to the first housing.

In some embodiments of the present disclosure, the second fixing portion is provided with a plurality of eighth grooves, and in the locking state, the first locking assembly abuts against the eighth grooves.

In some embodiments of the present disclosure, the first fixing portion and the eighth grooves are provided opposite to each other in the axial direction of the rotating part or opposite to each other in a radial direction of the rotating part.

In some embodiments of the present disclosure, the first locking assembly includes a first elastic part and a first movable part, one end of the first elastic part is connected to the first fixing portion, the other end of the first elastic part is connected to the first movable part, and the first movable part abuts against the eighth grooves.

In some embodiments of the present disclosure, the first fixing portion has a ninth groove configured to accommodate the first elastic part.

In some embodiments of the present disclosure, the air outlet support further includes a second locking assembly, the second housing has a third fixing portion, the rotating part has a fourth fixing portion, and in the locking state, the second locking assembly is located between the third fixing portion and the fourth fixing portion, for limiting the rotating part from moving relatively to the second housing.

In some embodiments of the present disclosure, the fourth fixing portion is provided with a plurality of tenth grooves, and in the locking state, the second locking assembly abuts against the tenth grooves.

In some embodiments of the present disclosure, the third fixing portion and the tenth grooves are provided opposite to each other in the axial direction of the rotating part or opposite to each other in a radial direction of the rotating part.

In some embodiments of the present disclosure, the second locking assembly includes a second elastic part and a second movable part, one end of the second elastic part is connected to the third fixing portion, the other end of the second elastic part is connected to the second movable part, and the second movable part abuts against the tenth grooves.

In some embodiments of the present disclosure, the third fixing portion has an eleventh groove configured to accommodate the second elastic part.

In some embodiments of the present disclosure, the second housing includes a first sub-second housing and a second sub-second housing, the first sub-second housing has a seventh through hole, the second sub-second housing has a first through hole and the third fixing portion, the second sub-second housing partially or completely extends into the seventh through hole, and the first sub-second housing and the rotating part are configured to limit the second sub-second housing from displacing in the axial direction of the rotating part.

In some embodiments of the present disclosure, the air outlet support further includes a third locking assembly, the first sub-second housing has a fifth fixing portion, the second sub-second housing has a sixth fixing portion, and in the locking state, the third locking assembly is located between the fifth fixing portion and the sixth fixing portion, for limiting the first sub-second housing from moving relatively to the second sub-second housing.

In some embodiments of the present disclosure, the fifth fixing portion is provided with a plurality of twelfth grooves, and in the locking state, the third locking assembly abuts against the twelfth grooves.

In some embodiments of the present disclosure, the rotating part includes a first rotating portion and a second rotating portion, a radial distance of the first rotating portion is greater than that of the second rotating portion, the second rotating portion has an external thread, the snapping part has a second bent portion, and the second bent portion is movably connected to the external thread.

In some embodiments of the present disclosure, a direction of the second bent portion at the movable joint is consistent or substantially consistent with a rotation direction of the external thread at the movable joint.

In some embodiments of the present disclosure, the second bent portion has a thirteenth groove.

In some embodiments of the present disclosure, the snapping part has at least one fourteenth groove, and the fourteenth groove is located at one side of the snapping part close to the first bent portion.

In some embodiments of the present disclosure, the second snapping part passes through the first through hole, the first snapping part has a third threaded portion, the second snapping part has a fourth threaded portion, and the third threaded portion is rotatably connected to the fourth threaded portion.

In some embodiments of the present disclosure, the fourth threaded portion is an external thread, the first snapping part has an eighth through hole, and the third threaded portion is an internal thread and is located in the eighth through hole.

In some embodiments of the present disclosure, the second housing has a first accommodating portion, and an end of the rotating part away from the first housing extends into the first accommodating portion.

In some embodiments of the present disclosure, the snapping part includes a third snapping part and a fourth snapping part, the third snapping part is rotatably connected to the fourth snapping part, the second housing has a second accommodating portion, an end of the third snapping part close to the rotating part is rotatably connected to the rotating part, an end of the third snapping part away from the rotating part extends into the second accommodating portion, and the fourth snapping part has the first bent portion, and can move in the second accommodating portion along the axial direction of the rotating part.

In some embodiments of the present disclosure, an end of the third snapping part close to the rotating part is provided with a first gear portion, an end of the rotating part close to the third snapping part is provided with a second gear portion, the first gear portion is meshed with the second gear portion, an end of the third snapping part away from the rotating part is provided with a fifth threaded portion, the fourth snapping part is provided with a sixth threaded portion, and the fifth threaded portion is rotatably connected to the sixth threaded portion.

In some embodiments of the present disclosure, an end of the second accommodating portion away from the rotating part is provided with a first portion, an end of the second accommodating portion close to the rotating part is provided with a second portion, and the first portion has a depth greater than that of the second portion.

In some embodiments of the present disclosure, the second housing further includes a third accommodating portion, and an end of the third snapping part close to the rotating part extends into the third accommodating portion.

In some embodiments of the present disclosure, the air outlet support further includes a fourth locking assembly, the second housing has a seventh fixing portion, the rotating part has an eighth fixing portion, and in the locking state, the fourth locking assembly is located between the seventh fixing portion and the eighth fixing portion, for limiting the rotating part from moving relatively to the second housing.

In some embodiments of the present disclosure, the eighth fixing portion is provided with a plurality of fifteenth grooves, and in the locking state, the fourth locking assembly abuts against the fifteenth grooves.

In some embodiments of the present disclosure, the fourth locking assembly includes a fourth elastic part and a fourth movable part, one end of the fourth elastic part is connected to the seventh fixing portion, the other end of the fourth elastic part is connected to the fourth movable part, and the fourth movable part abuts against the fifteenth grooves.

In some embodiments of the present disclosure, the seventh fixing portion has a sixteenth groove configured to accommodate the fourth elastic part.

In some embodiments of the present disclosure, the air outlet support further includes a fifth elastic part, and the fifth elastic part is sleeved over the second housing in a circumferential direction of the second housing, and abuts between the rotating part and the second housing.

Compared with the prior art, the beneficial effects of the present disclosure are as follows.

The present disclosure provides an air outlet support mountable to an air conditioner of an automobile, wherein the air outlet support mountable to an air conditioner of an automobile includes a first housing, a second housing, a snapping part, and a rotating part. The second housing is connected to the first housing, and has a first through hole; the snapping part penetrates through the first through hole and has a first bent portion; and the rotating part is rotatably arranged between the first housing and the second housing, and is movably connected to the snapping part. When the rotating part rotates, the snapping part is displaced along an axial direction of the rotating part, and the first housing and the second housing are configured to limit displacement of the rotating part in the axial direction of the rotating part.

According to the present disclosure, in use, by screwing the rotating part with one hand, the rotating part can be made to rotate so as to drive the snapping part and the first bent portion thereof to be synchronously displaced along the axial direction of the rotating part, such that the first bent portion is made to move towards a direction close to or away from the second housing. The movement of the first bent portion towards the direction close to the second housing can make the first bent portion to be hung and locked on a grille of an air outlet of the air conditioner of the automobile, such that the air outlet support as a whole is firmly hung and locked on the grille, which is convenient in use, and the air outlet support will not easily shake or fall off when being fixed on the grille, thereby effectively improving the stability and safety. The movement of the first bent portion towards the direction away from the second housing can make the first bent portion to be separated from the grille, so as to realize an unlocking function, so that it is convenient to adjust fixing angle and position of the air outlet support or detach the air outlet support as a whole from the grille.

BRIEF DESCRIPTION OF DRAWINGS

In order to more clearly illustrate technical solutions of embodiments of the present disclosure, drawings which need to be used in the embodiments will be introduced briefly below, and it should be understood that the drawings below merely show some embodiments of the present disclosure, and therefore, they should not be considered as limitation to the scope. A person ordinarily skilled in the art still could obtain other relevant drawings according to these drawings, without using any inventive efforts.

Figure 1:
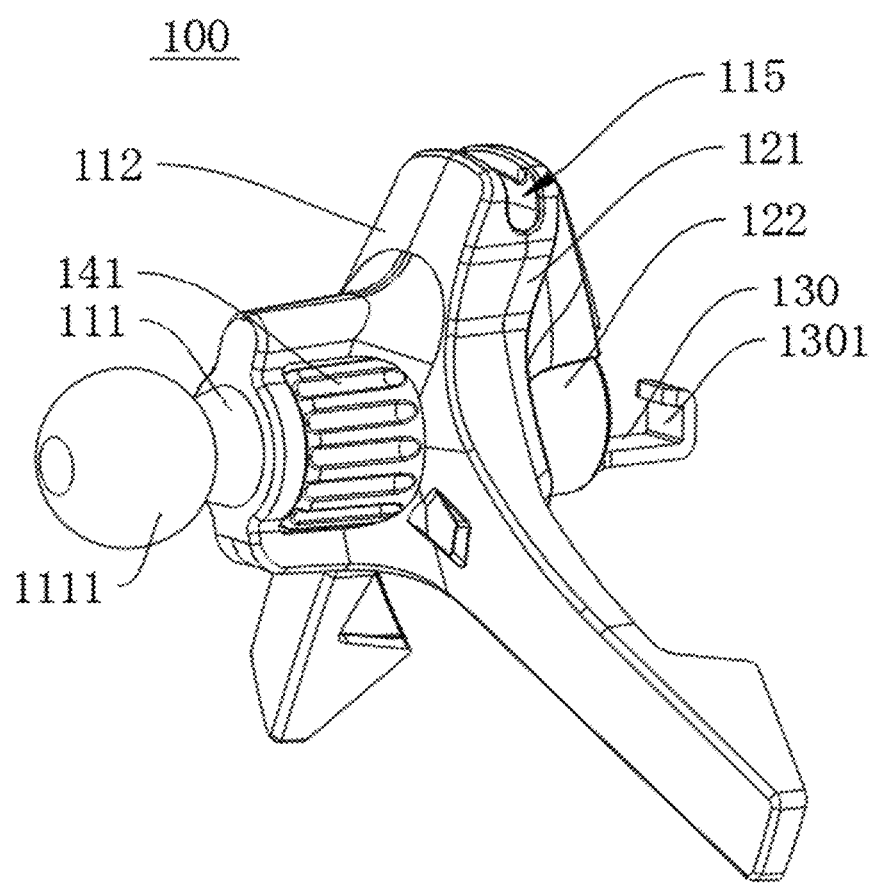
FIG. 1 shows a first perspective schematic diagram of an air outlet support mountable to an air conditioner of an automobile in some embodiments of the present disclosure, from one viewing angle.

Reference signs of main elements:

100—air outlet support; 110—first housing; 111—first sub-first housing; 1111—first connecting part; 112—second sub-first housing; 113—accommodating space; 114—first groove; 115—seventh groove; 116—first fixing portion; 1161—ninth groove; 119—first connecting portion; 120—second housing; 1201—first through hole; 12011—first sub-first through hole; 12012—second sub-first through hole; 1202—supporting portion; 1203—sixth groove; 1204—second protrusion; 1205—third fixing portion; 12051—eleventh groove; 1206—first accommodating portion; 1207—third accommodating portion; 1208—second accommodating portion; 12081—groove; 12082—through hole; 12083—first portion; 12084—second portion; 121—first sub-second housing; 1211—seventh through hole; 1212—fifth fixing portion; 12121—twelfth groove; 122—second sub-second housing; 1221—sixth fixing portion; 123—second connecting portion; 124—seventh fixing portion; 1241—sixteenth groove; 130—snapping part; 1301—first bent portion; 1302—second groove; 1303—second through hole; 1304—limiting portion; 1305—first threaded portion; 1306—second bent portion; 13061—thirteenth groove; 1307—fourteenth groove; 1308—third threaded portion; 1309—fourth threaded portion; 131—first snapping part; 1311—third groove; 1312—third through hole; 1313—fourth groove; 1314—fourth through hole; 1315—eighth through hole; 132—second snapping part; 1321—fifth groove; 1322—fifth through hole; 133—third snapping part; 1331—first gear portion; 1332—fifth threaded portion; 134—fourth snapping part; 1341—sixth threaded portion; 135—base portion; 140—rotating part; 1401—first protrusion; 1402—second threaded portion; 1403—sixth through hole; 1404—second fixing portion; 14041—eighth groove; 1405—fourth fixing portion; 14051—tenth groove; 1406—second gear portion; 141—first rotating part; 1411—first rotating portion; 14111—accommodating space; 1412—first snapping portion; 142—second rotating part; 1421—second rotating portion; 1422—second snapping portion; 143—eighth fixing portion; 1431—fifteenth groove; 150—first locking assembly; 151—first elastic part; 152—first movable part; 160—second locking assembly; 161—second elastic part; 162—second movable part; 170—third locking assembly; 171—third elastic part; 172—third movable part; 180—fourth locking assembly; 181—fourth elastic part; 182—fourth movable part; 190—fifth elastic part.

DETAILED DESCRIPTION OF EMBODIMENTS

Embodiments of the present disclosure are described in detail below, and examples of the embodiments are shown in the drawings, in which like or similar signs represent like or similar elements or elements having like or similar functions throughout the drawings. The embodiments described below with reference to the drawings are exemplary, and merely used to explain the present disclosure, but cannot be construed as limitation to the present disclosure.

In the description of the present disclosure, it should be understood that orientation or positional relations indicated by terms "center", "longitudinal", "lateral", "length", "width", "thickness", "upper", "lower", "front", "back", "left", "right", "vertical", "horizontal", "top", "bottom", "inner", "outer", "clockwise", "anticlockwise", "axial", "radial", and "circumferential" and so on are based on orientation or positional relations as shown in the drawings, merely for facilitating the description of the present disclosure and simplifying the description, rather than indicating or implying that related devices or elements have to be in the specific orientation or configured and operated in a specific orientation. Therefore, they should not be construed as limitation on the present disclosure.

In addition, the terms "first" and "second" are used for descriptive purposes only, and should not be understood as an indication or implication of importance in the relativity or an implicit indication of the number of the indicated technical features. Thus, a feature defined with the terms "first" and "second" may explicitly or implicitly include one or more such features. In the description of the present disclosure, "multiple (a plurality of)" refers to two or more than two, unless otherwise defined explicitly and specifically.

In the present disclosure, unless otherwise specified and defined explicitly, the terms such as "mount", "join", "connect", and "fix" should be construed in a broad sense, for example, a connection may be a fixed connection, a detachable connection, or an integral connection; it may be a mechanical connection, or also may be an electrical connection; it may be a direct connection, an indirect connection via an intermediary, or internal communication between two elements or interaction between two elements. For those ordinarily skilled in the art, specific meanings of the above-mentioned terms in the present disclosure can be understood according to specific circumstances.

In the present disclosure, unless otherwise specified and defined explicitly, a first feature being "above" or "below" a second feature may include the first feature and the second feature being in direct contact, or the first feature and the second feature being in indirect contact through an intermediary. Moreover, a first feature being "on", "over", and "above" a second feature may include a case where the first feature is directly above or not directly above the second feature, or merely indicates that the first feature is at a horizontal height higher than the second feature. The first feature being "under", "beneath", and "below" a second feature may include a case where the first feature is directly below or not directly below the second feature, or merely indicates that the first feature is at a horizontal height lower than the second feature.

As shown in FIG. 1, FIG. 9, FIG. 11, and FIG. 16, an embodiment of the present disclosure provides an air outlet support 100 mountable to an air conditioner of an automobile, wherein the air outlet support 100 includes a first housing 110, a second housing 120, a snapping part 130, and a rotating part 140.

Referring to FIG. 3, FIG. 4, FIG. 10, FIG. 13, and FIG. 18 together, the second housing 120 is connected to the first housing 110, and has a first through hole 1201; the snapping part 130 penetrates through the first through hole 1201 and has a first bent portion 1301; and the rotating part 140 is rotatably arranged between the first housing 110 and the second housing 120, and is movably connected to the snapping part 130. When the rotating part 140 rotates, the snapping part 130 is displaced along an axial direction of the rotating part 140, and the first housing 110 and the second housing 120 are configured to limit displacement of the rotating part 140 in the axial direction of the rotating part 140.

When the air outlet support 100 provided in the embodiments of the present disclosure is in use, by screwing the rotating part 140 with one hand, the rotating part 140 can be made to rotate so as to drive the snapping part 130 and the first bent portion 1301 thereof to be synchronously displaced along the axial direction of the rotating part 140, such that the first bent portion 1301 is made to move towards a direction close to or away from the second housing 120. The movement of the first bent portion 1301 towards the direction close to the second housing 120 can make the first bent portion 1301 to be hung and locked on a grille of an air outlet of the air conditioner of the automobile, such that the air outlet support 100 as a whole is firmly hung and locked on the grille, which is convenient in use, and the air outlet support will not easily shake or fall off when being fixed on the grille, thereby effectively improving stability and safety. The movement of the first bent portion 1301 towards the direction away from the second housing 120 can make the first bent portion 1301 to be separated from the grille, so as to realize an unlocking function, so that it is convenient to adjust fixing angle and position of the air outlet support 100 or detach the air outlet support 100 as a whole from the grille.

As shown in FIG. 2, FIG. 9, FIG. 12, and FIG. 17, in one embodiment of the present disclosure, optionally, the first housing 110 includes a first sub-first housing 111 and a second sub-first housing 112. The first sub-first housing 111 has a first connecting part 1111, and the second sub-first housing 112 is connected to the second housing 120. The rotating part 140 is rotatably provided between the second sub-first housing 112 and the second housing 120.

In the present embodiment, the first connecting part 1111 of the first sub-first housing 111 may be a connecting ball head used to be connected to a bracket for fixing an electronic device. The bracket fixing the electronic device may be a magnetic type bracket or a clamping type bracket, so as to realize a function of fixing the electronic device. This bracket has a connecting ball socket matched with the connecting ball head, so that this bracket is rotatably connected to the air outlet support 100, such that a function that angles of this bracket and the electronic device fixed on this bracket can be adjusted is realized. Therefore, a user can adjust the electronic device to a relatively good angle for use. The rotating part 140 is rotatably provided between the second sub-first housing 112 and the second housing 120, so that by screwing the rotating part 140 with one hand, the user can make the rotating part 140 rotate so as to drive the snapping part 130 and the first bent portion 1301 thereof to be synchronously displaced along the axial direction of the rotating part 140, thereby making the first bent portion 1301 move towards the direction close to or away from the second housing 120, and realizing the locking or unlocking function.

Figure 3:
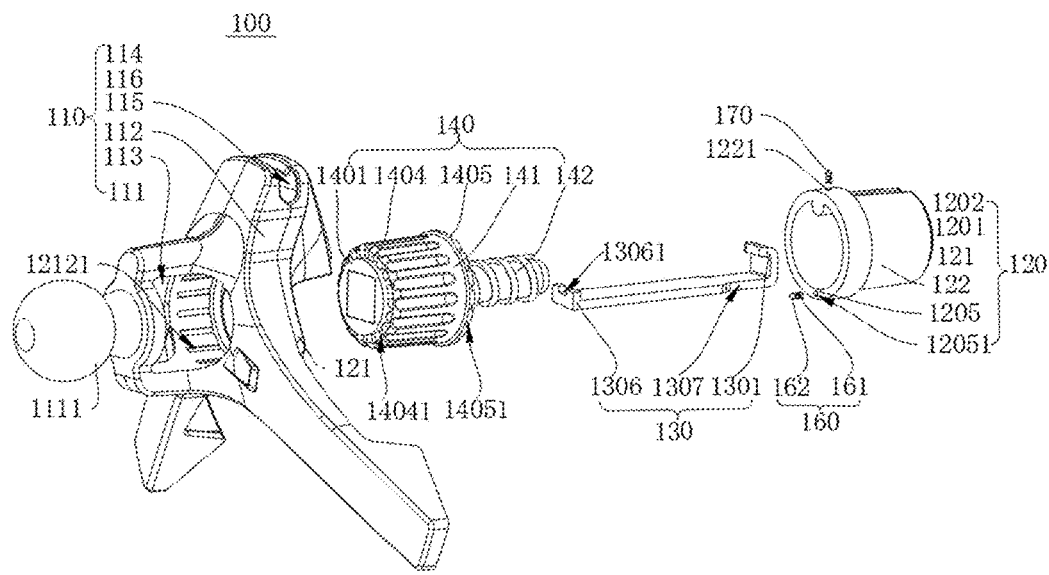
FIG. 3 shows a first exploded schematic diagram of the air outlet support mountable to an air conditioner of an automobile in some embodiments of the present disclosure, from one viewing angle.
Figure 4:
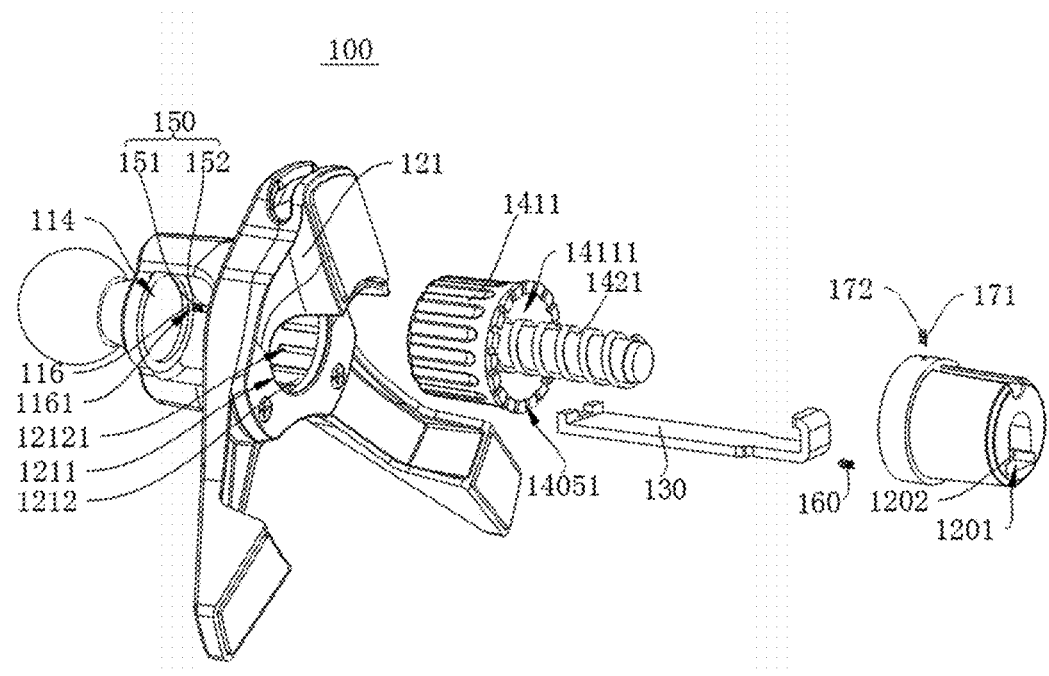
FIG. 4 shows a first exploded schematic diagram of the air outlet support mountable to an air conditioner of an automobile in some embodiments of the present disclosure, from another viewing angle.

As shown in FIG. 1, FIG. 3, and FIG. 4, in one embodiment of the present disclosure, optionally, the first housing 110 and the second housing 120 form an accommodating space 113, and the rotating part 140 is rotatably provided in the accommodating space 113.

In the present embodiment, by rotatably providing the rotating part 140 in the accommodating space 113 formed between the first housing 110 and the second housing 120, the user can make the rotating part 140 rotate by screwing the rotating part 140 with one hand so as to drive the snapping part 130 and the first bent portion 1301 thereof to be synchronously displaced along the axial direction of the rotating part 140. Meanwhile, this also has a certain protective effect on the rotating part 140, and has an effect of preventing unintended touch, to prevent the air outlet support 100 from shaking or falling off due to unlocking caused by unintended touch.

Figure 5:
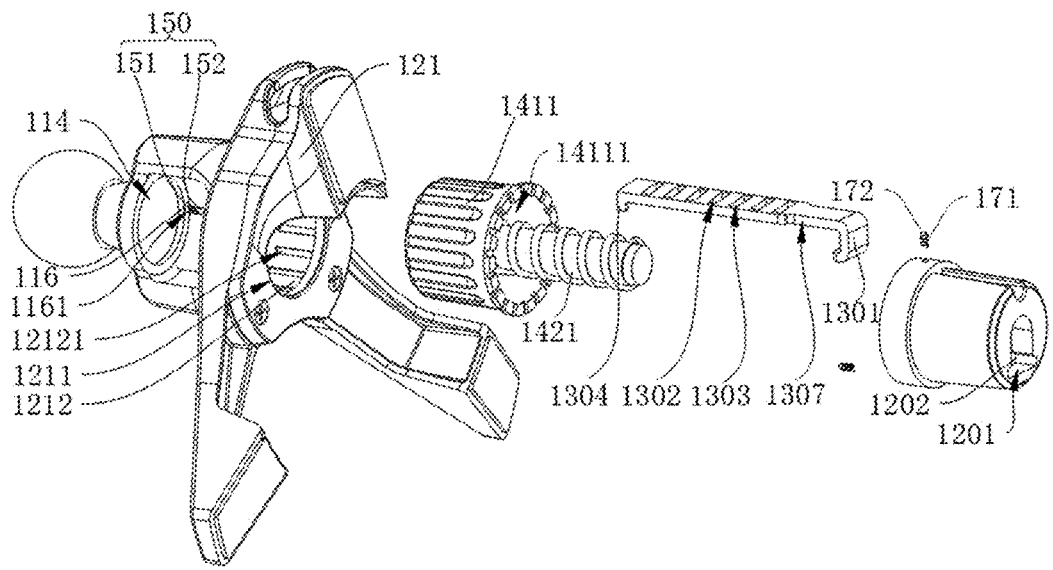
FIG. 5 shows a first exploded schematic diagram of the air outlet support mountable to an air conditioner of an automobile in some embodiments of the present disclosure, from another viewing angle.
Figure 6:
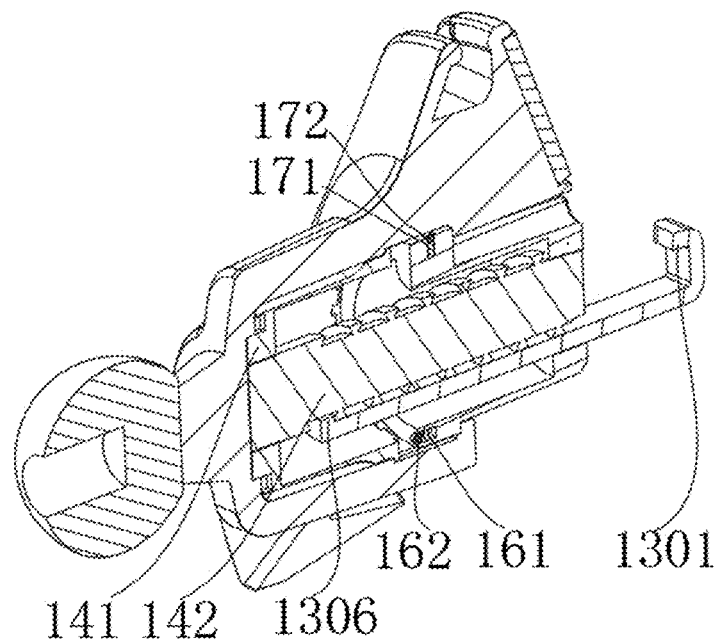
FIG. 6 shows a first sectional schematic diagram of the air outlet support mountable to an air conditioner of an automobile in some embodiments of the present disclosure, from one viewing angle.
Figure 7:
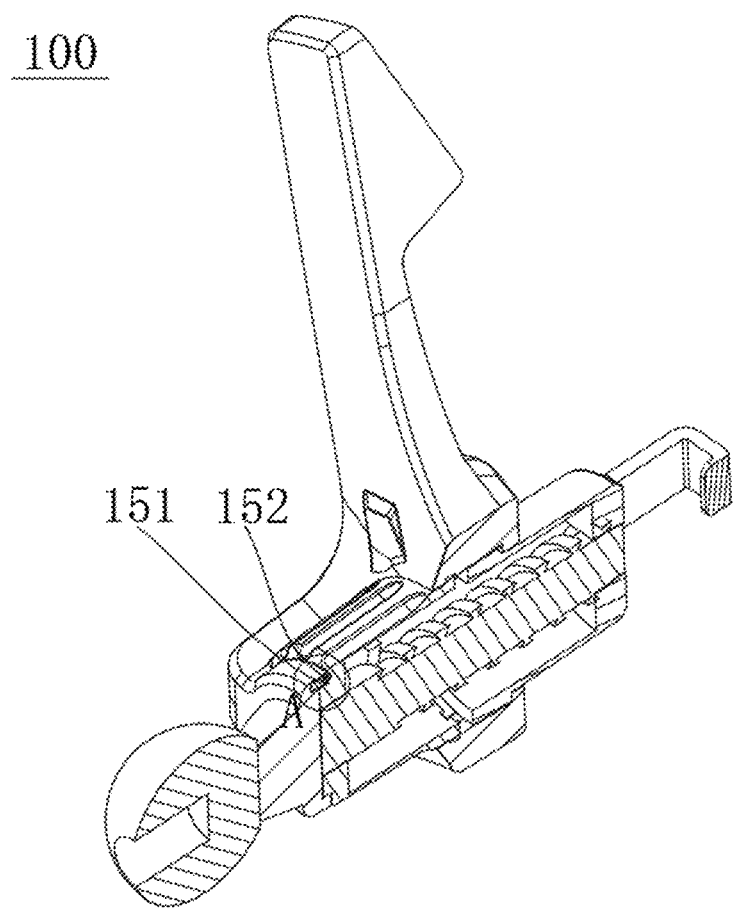
FIG. 7 shows a first sectional schematic diagram of the air outlet support mountable to an air conditioner of an automobile in some embodiments of the present disclosure, from another viewing angle.
Figure 8:
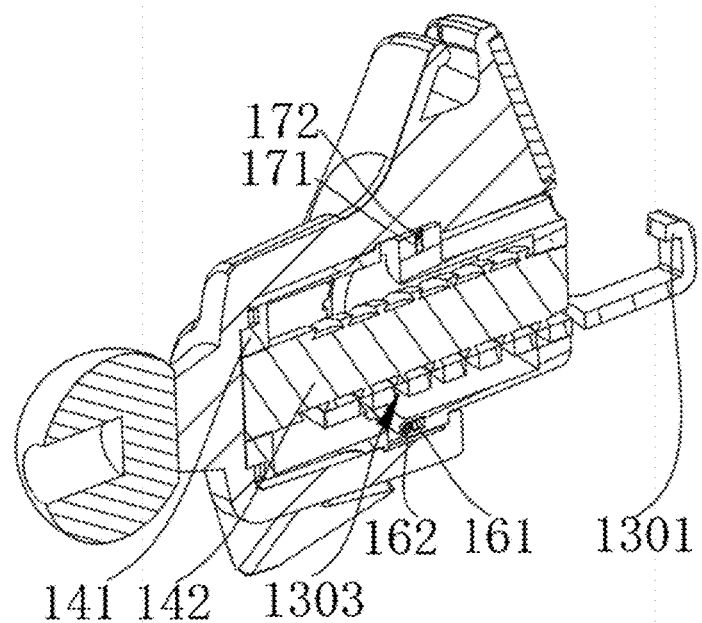
FIG. 8 shows a first sectional schematic diagram of the air outlet support mountable to an air conditioner of an automobile in some embodiments of the present disclosure, from another viewing angle.
Figure 9:
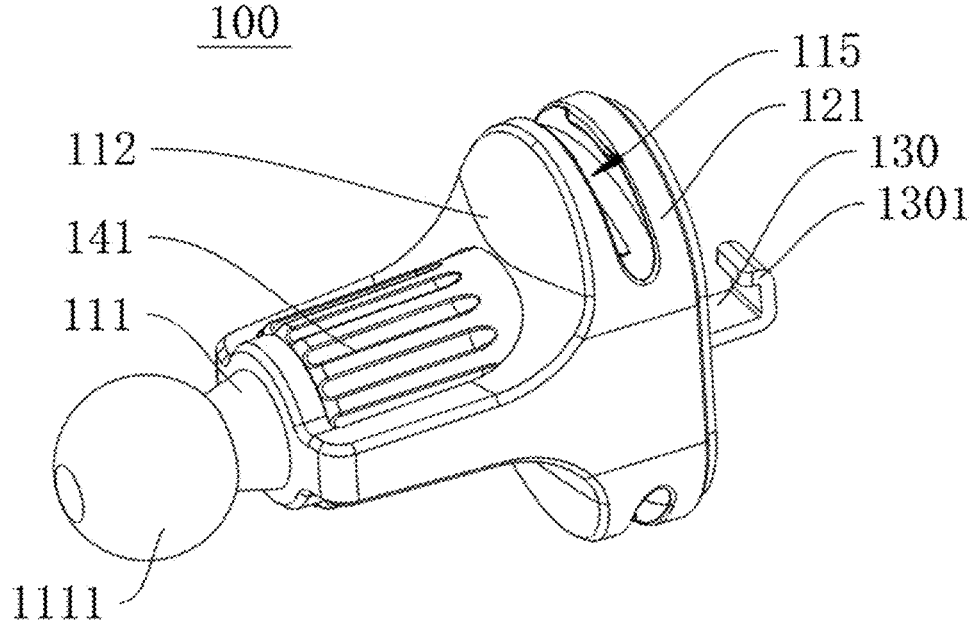
FIG. 9 shows a second perspective schematic diagram of the air outlet support mountable to an air conditioner of an automobile in some embodiments of the present disclosure, from one viewing angle.

As shown in FIG. 3, FIG. 4, and FIG. 5, in the above embodiments of the present disclosure, optionally, the first housing 110 has a first groove 114, the rotating part 140 has a first protrusion 1401, and the first protrusion 1401 is rotatably provided in the first groove 114.

In the present embodiment, the first groove 114 is a cylindrical groove, and the first protrusion 1401 is a cylindrical protrusion matched with the cylindrical groove. By rotatably providing the first protrusion 1401 of the rotating part 140 in the first groove 114 of the first housing 110, the rotation of the rotating part 140 can be guided and limited, so as to facilitate the rotation of the rotating part 140 around an axis thereof, and improve the rotation stability, so that the snapping part 130 can be stably displaced along the axial direction of the rotating part 140.

As shown in FIG. 3, FIG. 4, and FIG. 5, in the above embodiments of the present disclosure, optionally, the rotating part 140 includes a first rotating portion 1411 and a second rotating portion 1421. A radial distance of the first rotating portion 1411 is greater than that of the second rotating portion 1421. The second rotating portion 1421 has an external thread, the snapping part 130 has second grooves 1302 or second through holes 1303, and the external thread is movably connected to the second grooves 1302 or the second through holes 1303. A direction of the second grooves 1302 or the second through holes 1303 at the movable joint is consistent or substantially consistent with a rotation direction of the external thread at the movable joint. For convenience of transmission, the second grooves 1302 or the second through holes 1303 are arranged at intervals, and a distance between any two adjacent second grooves 1302 or second through holes 1303 is the same as pitch of the external thread of the second rotating portion 1421. In order to prevent the external thread of the second rotating portion 1421 from interfering with the part of the second grooves 1302 or the second through holes 1303 of the snapping part 130, the number of the second grooves 1302 or the second through holes 1303 is greater than the number of turns of the external thread of the second rotating portion 1421.

In the present embodiment, the radial distance of the first rotating portion 1411 is greater than the radial distance of the second rotating portion 1421. The first rotating portion 1411 has an accommodating space 14111, a part of the second rotating portion 1421 is in the accommodating space 14111, and the first rotating portion 1411 is coaxial or substantially coaxial with the second rotating portion 1421, so that when a person screws the first rotating portion 1411 with hand with a relatively small force, the second rotating portion 1421 coaxial or substantially coaxial with the first rotating portion 1411 drives the snapping part 130 to be displaced along the axial direction of the rotating part 140. Meanwhile, the external thread of the second rotating portion 1421 is movably connected to the second grooves 1302 or the second through holes 1303 of the snapping part 130, where a manner of movable connection is that the external thread extends into the second grooves 1302 or the second through holes 1303, and in order to connect the second rotating portion 1421 and the snapping part 130 more firmly, the direction of the second grooves 1302 or the second through holes 1303 at the movable joint is consistent or substantially consistent with the rotation direction of the external thread at the movable joint. Compared with the case where the direction of the second grooves 1302 or the second through holes 1303 at the movable joint is inconsistent with the rotation direction of the external thread at the movable joint, the external thread of the second rotating portion 1421 matched with the second grooves 1302 or the second through holes 1303 has a larger area. In this way, when the second rotating portion 1421 and the external thread thereon synchronously rotate along with the first rotating portion 1411, it is easier to realize the function of driving the snapping part 130 to be displaced along the axial direction of the rotating part 140 by using the second grooves 1302 or the second through holes 1303 movably connected to the external thread.

As shown in FIG. 5, FIG. 6, FIG. 7, and FIG. 8, in the above embodiments of the present disclosure, optionally, when the first bent portion 1301 faces a first direction, that is, when the first bent portion 1301 faces an automobile chassis, according to different structural forms of the snapping part 130, the second rotating portion 1421 can be provided above the snapping part 130, and also can be provided below the snapping part 130. At this time, the first rotating part 1411 is located at one end of the air outlet support 100, and the first bent portion 1301 is located at the other end of the air outlet support 100. Therefore, when the air outlet support 100 is in use, the first rotating portion 1411 is located outside the air outlet of the air conditioner of the automobile so as to be screwed by the user with one hand, and the snapping part 130 is located inside the air outlet of the air conditioner of the automobile so as to be hung and locked on the grille. When the first rotating portion 1411 rotates, the function of driving the snapping part 130 to move along the axial direction of the rotating part 140 is realized.

As shown in FIG. 3, FIG. 4, and FIG. 5, in the above embodiments of the present disclosure, optionally, a side of the second housing 120 facing the first housing 110 is provided with a supporting portion 1202, for supporting the snapping part 130.

In the present embodiment, the side of the second housing 120 facing the first housing 110 is provided with the supporting portion 1202 for supporting the snapping part 130, so as to support, limit, and guide the movement of the snapping part 130 through the supporting portion 1202, thereby facilitating the displacement of the snapping part 130 along the axial direction of the rotating part 140.

As shown in FIG. 5, in the above embodiments of the present disclosure, optionally, the snapping part 130 has at least one limiting portion 1304 on a side facing the supporting portion 1202 between the first housing 110 and the second housing 120.

Figure 20:
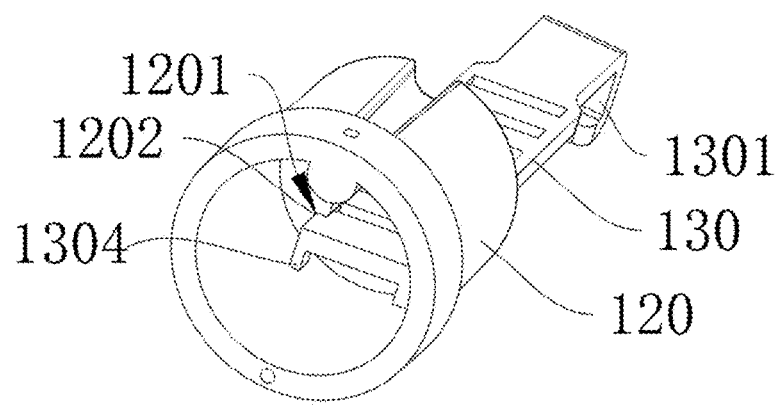
FIG. 20 shows an assembly schematic diagram of a snapping part and a second housing in FIG. 5.

In the present embodiment, the snapping part 130 has at least one limiting portion 1304 on the side facing the supporting portion 1202 between the first housing 110 and the second housing 120, so as to function to limit the snapping part 130 through the limiting portion 1304, thereby preventing the snapping part 130 from detaching and dropping from the supporting portion 1202 through the first through hole 1201. As shown in FIG. 20, exemplarily, the limiting portion 1304 is of a convex structure, and the limiting portion 1304 is provided at an end of the snapping part 130 away from the first bent portion 1301. In this way, when the end of the snapping part 130 away from the first bent portion 1301 moves to be close to an end surface of the limiting portion 1304, the limiting portion 1304 abuts against an end surface of an end of the supporting portion 1202 facing the rotating part 140, so as to prevent the snapping part 130 from detaching or dropping from the supporting portion 1202 through the first through hole 1201.

As shown in FIG. 3, FIG. 4, and FIG. 5, in the above embodiments of the present disclosure, optionally, the second rotating portion 1421 extends into the first through hole 1201. Thus, the second rotating portion 1421 is limited by the first through hole 1201, so that the second rotating portion 1421 only rotates without generating displacement, and the snapping part 130 can be displaced along the axial direction of the rotating part 140.

As shown in FIG. 3, FIG. 4, and FIG. 5, in the above embodiments of the present disclosure, optionally, the rotating part 140 includes a first rotating part 141 and a second rotating part 142. The first rotating part 141 and the second rotating part 142 are coaxial or substantially coaxial, the first rotating part 141 has the first rotating portion 1411, the second rotating part 142 has the second rotating portion 1421, and the first rotating part 141 is detachably connected to the second rotating part 142. Therefore, the first rotating part 141 and the second rotating part 142 are provided separately, thereby facilitating installation and disassembly, and improving installing and disassembling efficiency.

As shown in FIG. 3 and FIG. 4, in the above embodiments of the present disclosure, optionally, the first rotating part 141 is snapped with the second rotating part 142.

Figure 21:
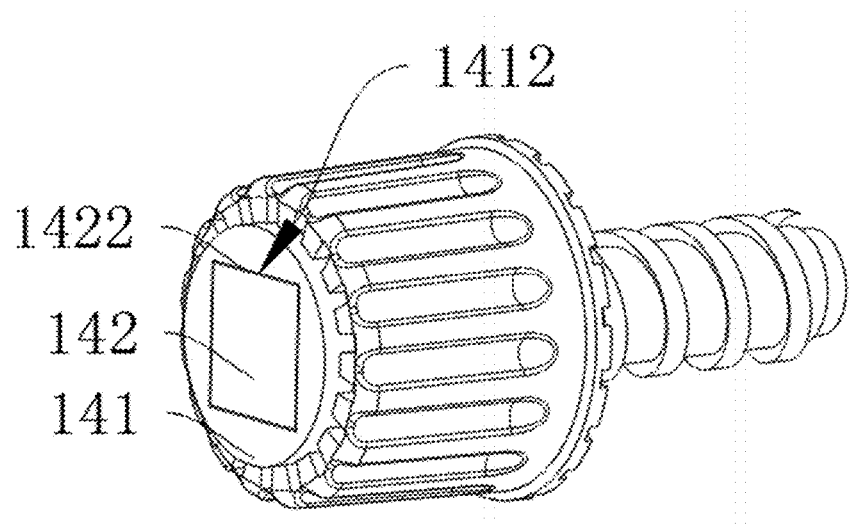
FIG. 21 shows an assembly schematic diagram of a first rotating part and a second rotating part in FIG. 3.

Referring to FIG. 21, in the present embodiment, the first rotating part 141 has a first snapping portion 1412, and the first snapping portion 1412 is a round or polygonal through hole or groove. The second rotating part has a second snapping portion 1422, and the second snapping portion 1422 is in a round or polygonal structure matched with the first snapping portion 1412. The first rotating part 141 and the second rotating part 142 are snapped to each other through the first snapping portion 1412 and the second snapping portion 1422. In this way, the second rotating part 142 can synchronously rotate with the first rotating part 141, thereby driving the snapping part 130 to be displaced along the axial direction of the rotating part 140. Further, in order to improve stability of the clamping between the first rotating part 141 and the second rotating part 142, an area of a side of the first snapping portion 1412 close to the first housing 110 is smaller than an area of a side of the first snapping portion 1412 away from the first housing 110, and an area of a side of the second snapping portion 1422, adapted to the first snapping portion 1412, close to the first housing 110, is smaller than an area of a side of the first snapping portion 1412 away from the first housing 110.

As shown in FIG. 3, FIG. 5, FIG. 6, FIG. 7, and FIG. 8, in the above embodiments of the present disclosure, optionally, when the first bent portion 1301 faces the first direction, that is, when the first bent portion 1301 faces the automobile chassis, according to different structural forms of the snapping part 130, the second rotating part 142 can be provided above the snapping part 130, and also can be provided below the snapping part 130. At this time, the first rotating part 141 is located at one end of the air outlet support 100, and the first bent portion 1301 is located at the other end of the air outlet support 100. Thus, when the air outlet support 100 is in use, the first rotating part 141 is located outside the air outlet of the air conditioner of the automobile so as to be screwed by the user with one hand, and the snapping part 130 is located inside the air outlet of the air conditioner of the automobile so as to be hung and locked on the grille. When the first rotating part 141 rotates, it drives the second rotating part 142 to rotate synchronously, so as to realize the function of driving the snapping part 130 to be displaced along the axial direction of the rotating part 140.

Figure 16:
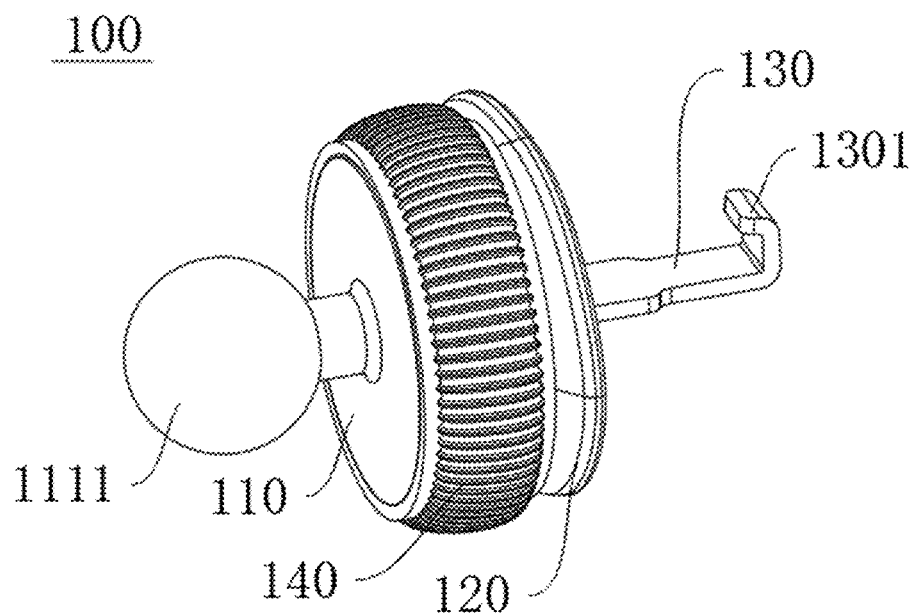
FIG. 16 shows a fourth perspective schematic diagram of the air outlet support mountable to an air conditioner of an automobile in some embodiments of the present disclosure, from one viewing angle.
Figure 18:
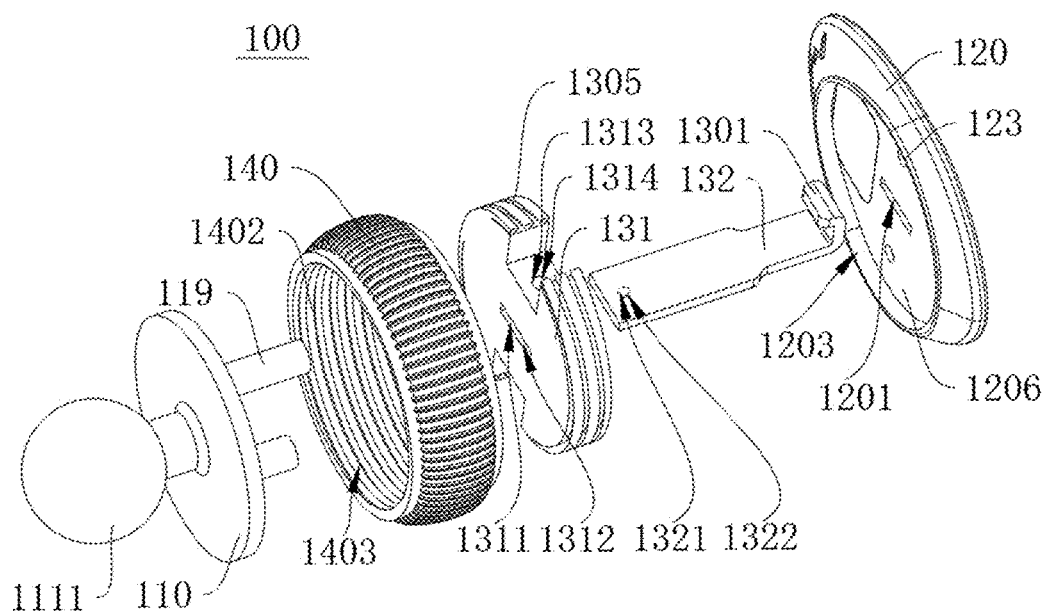
FIG. 18 shows a fourth exploded schematic diagram of the air outlet support mountable to an air conditioner of an automobile in some embodiments of the present disclosure, from one viewing angle.
Figure 19:
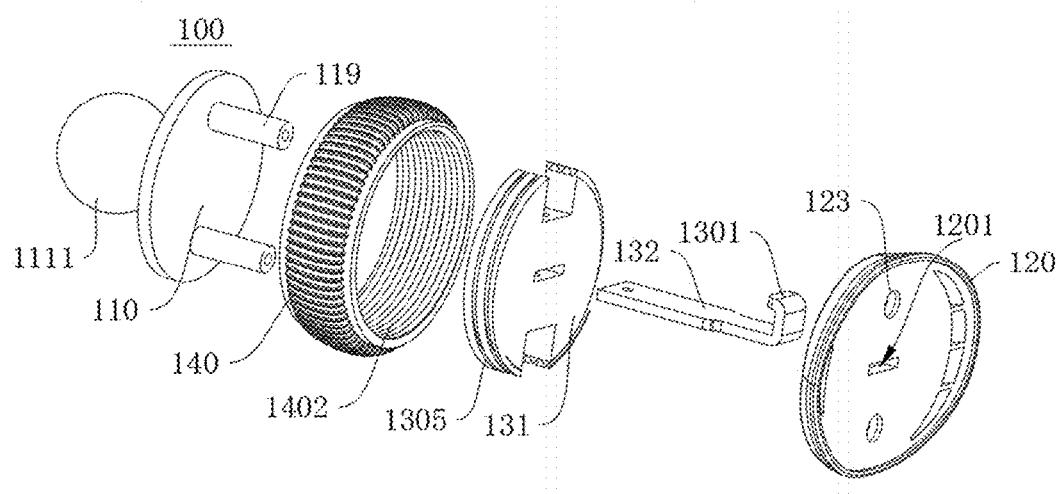
FIG. 19 shows a fourth exploded schematic diagram of the air outlet support mountable to an air conditioner of an automobile in some embodiments of the present disclosure, from another viewing angle.

As shown in FIG. 16, FIG. 18, and FIG. 19, in one embodiment of the present disclosure, optionally, the snapping part 130 is rotatably connected to the rotating part 140. Thus, the snapping part 130 can be displaced along the axial direction of the rotating part 140 under the action of the rotating part 140.

As shown in FIG. 16, FIG. 18, and FIG. 19, in the above embodiments of the present disclosure, optionally, an end of the snapping part 130 facing the rotating part 140 has a first threaded portion 1305, the rotating part 140 has a second threaded portion 1402, and the first threaded portion 1305 is rotatably connected to the second threaded portion 1402.

In the present embodiment, the first threaded portion 1305 of the snapping part 130 is rotatably connected to the second threaded portion 1402 of the rotating part 140. By screwing the rotating part 140 with one hand, the user can make the rotating part 140 rotate so as to drive the snapping part 130 to be displaced along the axial direction of the rotating part 140, so that the first bent portion 1301 of the snapping part 130 is made to move towards the direction close to or away from the second housing 120. The movement of the first bent portion 1301 towards the direction close to the second housing 120 can make the first bent portion 1301 to be hung and locked on the grille of the air outlet of the air conditioner of the automobile, such that the air outlet support 100 as a whole is firmly hung and locked on the grille, and the movement of the first bent portion 1301 towards the direction away from the second housing 120 can make the first bent portion 1301 to be separated from the grille, so as to realize the unlocking function.

Figure 17:
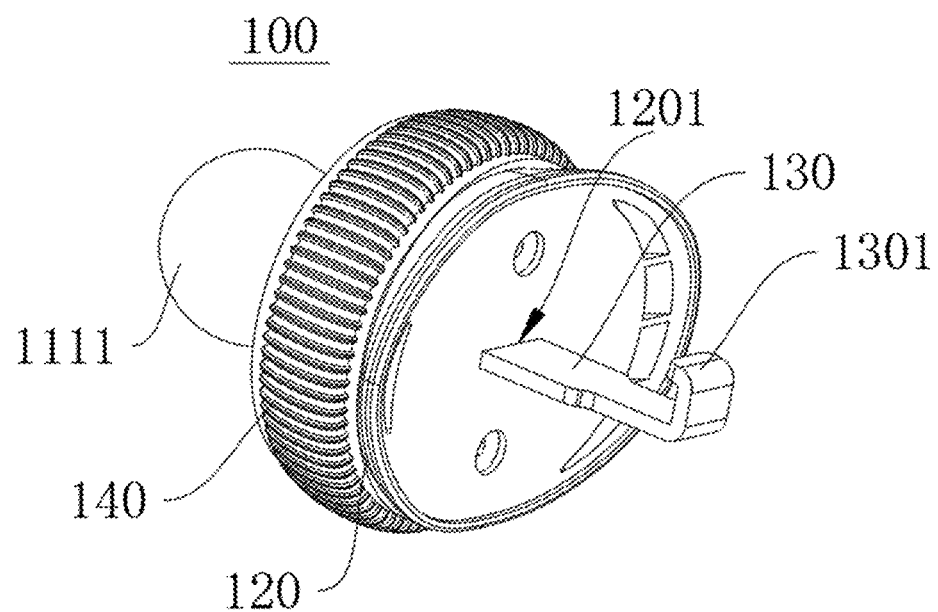
FIG. 17 shows a fourth perspective schematic diagram of the air outlet support mountable to an air conditioner of an automobile in some embodiments of the present disclosure, from another viewing angle.

As shown in FIG. 17, FIG. 18, and FIG. 19, in the above embodiments of the present disclosure, optionally, the first threaded portion 1305 is an external thread, and the second threaded portion 1402 is an internal thread. Thus, through threaded fit, the rotating part 140 is made to rotate so as to drive the snapping part 130 to be displaced along the axial direction of the rotating part 140.

As shown in FIG. 16, FIG. 18, and FIG. 19, in the above embodiments of the present disclosure, optionally, the snapping part 130 has a first snapping part 131 and a second snapping part 132. The first snapping part 131 has the first threaded portion 1305, the second snapping part 132 has the first bent portion 1301, and the second snapping part 132 or the first snapping part 131 passes through the first through hole 1201. Thus, by screwing the rotating part 140 with one hand, the user can make the rotating part 140 rotate so as to drive the first snapping part 131 to be displaced along the axial direction of the rotating part 140, so as to drive the second snapping part 132 to be synchronously displaced along the axial direction of the rotating part 140, and further make the first bent portion 1301 of the second snapping part 132 move towards the direction close to or away from the second housing 120.

As shown in FIG. 17, FIG. 18, and FIG. 19, in the above embodiments of the present disclosure, optionally, the second snapping part 132 passes through the first through hole 1201, the first snapping part 131 has a third groove 1311 or a third through hole 1312 along the axial direction of the rotating part 140, and the second snapping part 132 extends into the third groove 1311 or the third through hole 1312 to be connected to the first snapping part 131.

In the present embodiment, by providing the third groove 1311 or the third through hole 1312 on the first snapping part 131 along the axial direction of rotating part 140, the second snapping part 132 extends into the third groove 1311 or the third through hole 1312 to be connected to the first snapping part 131, thereby realizing the function of firmly connecting the first snapping part 131 and the second snapping part 132, so as to enable the second snapping part 132 to synchronously move along with the first snapping part 131. A specific connecting manner of the second snapping part 132 and the first snapping part 131 includes, but is not limited to, snap-fit, screw connection, bonding, thread connection and the like.

As shown in FIG. 18 and FIG. 19, in the above embodiments of the present disclosure, optionally, the air outlet support 100 further includes a fixing part (not shown). The first snapping part 131 has a fourth groove 1313 or a fourth through hole 1314 along the radial direction of the rotating part 140, the fourth groove 1313 or the fourth through hole 1314 is in communication with the third groove 1311 or the third through hole 1312, and the fixing part is configured to be connected to the second snapping part 132 through the fourth groove 1313 or the fourth through hole 1314.

In the present embodiment, by providing the fourth groove 1313 or the fourth through hole 1314 along the radial direction of the rotating part 140 on the first snapping part 131, making the fourth groove 1313 or the fourth through hole 1314 be in communication with the third groove 1311 or the third through hole 1312, and meanwhile providing the fixing part to pass through the fourth groove 1313 or the fourth through hole 1314 to connect the second snapping part 132, the connection stability is further improved, and the function of firmly connecting the first snapping part 131 and the second snapping part 132 is realized, so that the second snapping part 132 can synchronously move stably along with the first snapping part 131. Exemplarily, the fixing part may be a screw.

As shown in FIG. 18, in the above embodiments of the present disclosure, optionally, the second snapping part 132 has a fifth groove 1321 or a fifth through hole 1322, and the fixing part extends into the fifth groove 1321 or the fifth through hole 1322.

In the present embodiment, by providing the fifth groove 1321 or the fifth through hole 1322 on the second snapping part 132, and making the fixing part extend into the fifth groove 1321 or the fifth through hole 1322, the connection stability between the second snapping part 132 and the first snapping part 131 can be further improved. Exemplarily, the fifth groove 1321 or the fifth through hole 1322 has a thread adapted with the fixing part.

As shown in FIG. 18, in one embodiment of the present disclosure, optionally, the rotating part 140 has a sixth through hole 1403, and a connecting portion of the first housing 110 and the second housing 120 is partially or completely accommodated in the sixth through hole 1403. Exemplarily, the first housing 110 has a first connecting portion 119, and the second housing 120 has a second connecting portion 123. The second connecting portion 123 includes two cylinders having an internal thread, the first connecting portion 119 includes two through holes adapted to the second connecting portion 123, the snapping part 130 has two grooves or through holes for the second connecting portion 123 to pass through, and the first connecting portion 119 and the second connecting portions 123 are connected by screws. The second connecting portion 123 is accommodated in the sixth through hole 1403. Alternatively, the first housing 110 has a first connecting portion 119, and the second housing 120 has a second connecting portion 123. The first connecting portion 119 includes two cylinders having an internal thread, the second connecting portion 123 includes two cylinders having a through hole and adapted to the first connecting portion 119, the snapping part 130 has two grooves or through holes for the first connecting portion 119 and the second connecting portion 123 to pass through, and the first connecting portion 119 and the second connecting portion 123 are connected by screws. The first connecting portion 119 and the second connecting portion 123 are accommodated in the sixth through hole 1403. Therefore, the connecting portion of the first housing 110 and the second housing 120 is partially or completely accommodated in the sixth through hole 1403, so that the structure is simple and compact, a space utilization rate is improved, and aesthetics of the air outlet support 100 is effectively improved.

As shown in FIG. 16 and FIG. 18, in the above embodiments of the present disclosure, optionally, an end of the first housing 110 facing the second housing 120 extends into the sixth through hole 1403.

In the present embodiment, the first housing 110 has the first connecting portion 119, the second housing 120 has the second connecting portion 123. The first connecting portion 119 includes two cylinders having an internal thread, the second connecting portion 123 includes two through holes adapted to the first connecting portion 119, the snapping part 130 has two grooves or through holes for the first connecting portion 119 to pass through, and the first connecting portion 119 and the second connecting portion 123 are connected by screws. The first connecting portion 119 extends into the sixth through hole 1403. By making the end of the first housing 110 facing the second housing 120 extend into the sixth through hole 1403, a part of the connecting portion of the first housing 110 is hidden inside the sixth through hole 1403, thereby effectively improving the space utilization rate and aesthetics.

As shown in FIG. 16 and FIG. 18, in the above embodiments of the present disclosure, optionally, the second housing 120 has a sixth groove 1203, and an end of the rotating part 140 facing the second housing 120 is accommodated in the sixth groove 1203.

In the present embodiment, by providing the sixth groove 1203 on the second housing 120, and accommodating the end of the rotating part 140 facing the second housing 120 in the sixth groove 1203, so as to function to guide and limit the rotating part 140 by the sixth groove 1203, it facilitates stable rotation of the rotating part 140 around its axis, so that the rotating part 140 only rotates and cannot be displaced along the axial direction thereof, thereby enabling the snapping part 130 movably connected to the rotating part 140 to be displaced along the axial direction of the rotating part 140. Meanwhile, by accommodating the end of the rotating part 140 facing the second housing 120 in the sixth groove 1203, the aesthetics is also effectively improved.

Figure 10:
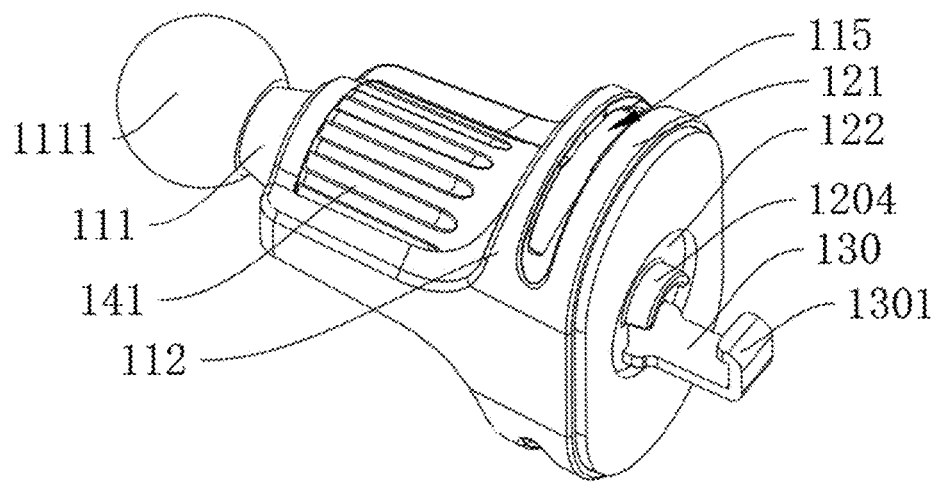
FIG. 10 shows a second perspective schematic diagram of the air outlet support mountable to an air conditioner of an automobile in some embodiments of the present disclosure, from another viewing angle.
Figure 11:
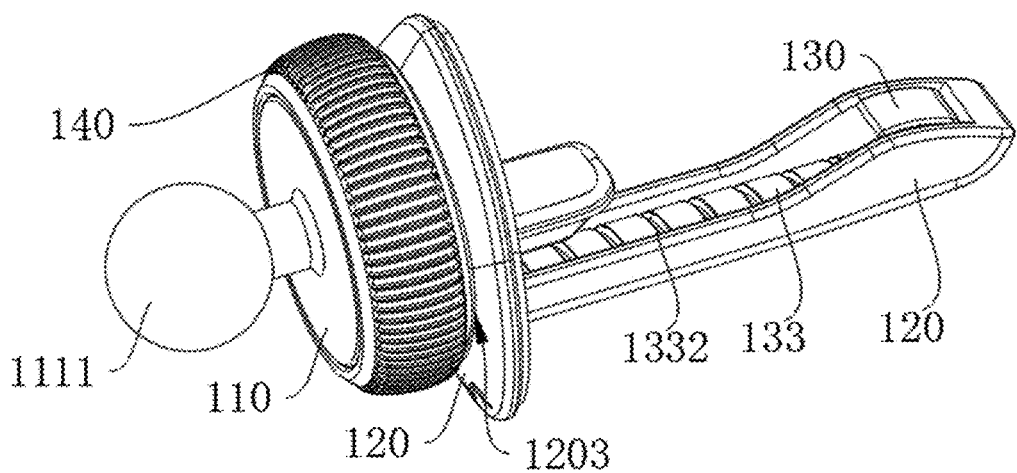
FIG. 11 shows a third perspective schematic diagram of the air outlet support mountable to an air conditioner of an automobile in some embodiments of the present disclosure, from one viewing angle.
Figure 12:
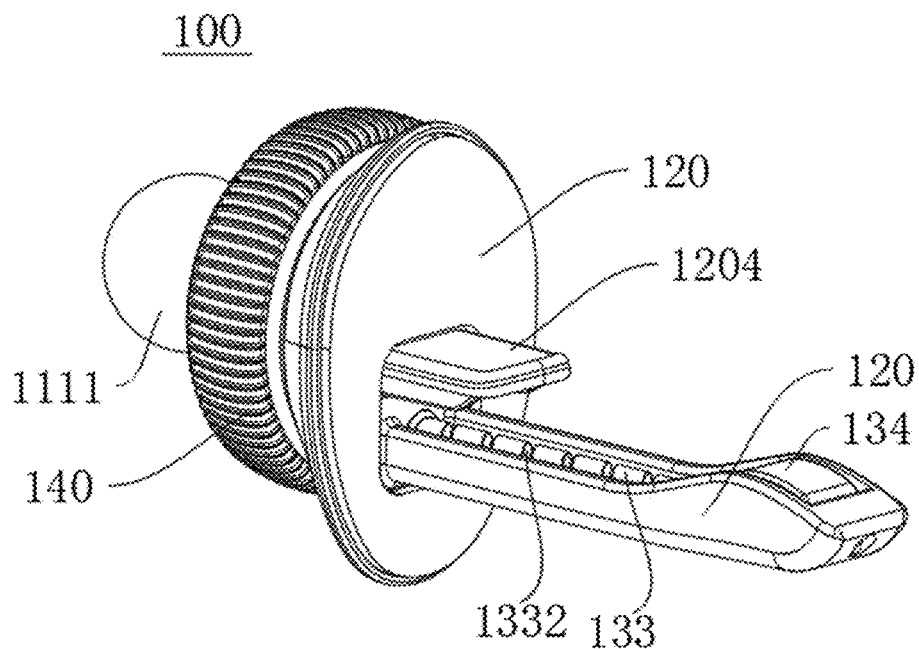
FIG. 12 shows a third perspective schematic diagram of the air outlet support mountable to an air conditioner of an automobile in some embodiments of the present disclosure, from another viewing angle.
Figure 14:
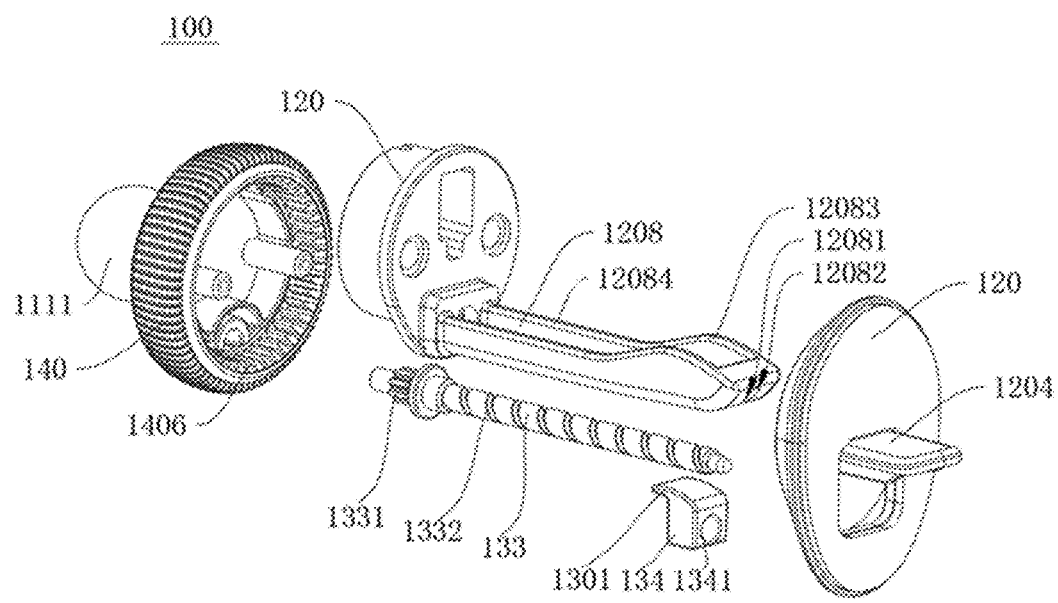
FIG. 14 shows a third exploded schematic diagram of the air outlet support mountable to an air conditioner of an automobile in some embodiments of the present disclosure, from another viewing angle.

As shown in FIG. 10, FIG. 12, and FIG. 14, in one embodiment of the present disclosure, optionally, the second housing 120 has at least one second protrusion 1204 at an end away from the first housing 110.

In the present embodiment, by providing at least one second protrusion 1204 at the end of the second housing 120 away from the first housing 110, so as to function to guide and limit the grille of the air outlet of the air conditioner of the automobile through the second protrusion 1204 and the snapping part 130, the snapping part 130, when being displaced along the axial direction of the rotating part 140, is prevented from detaching and falling off from the grille of the air outlet of the air conditioner of the automobile.

Figure 2:
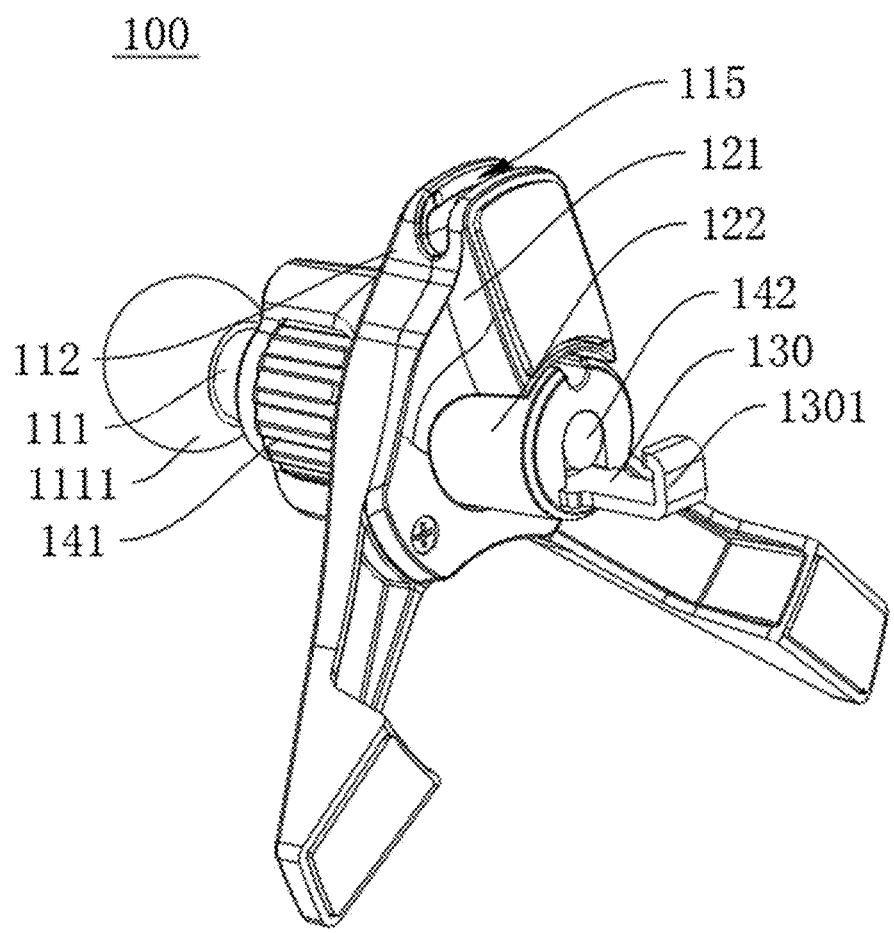
FIG. 2 shows a first perspective schematic diagram of the air outlet support mountable to an air conditioner of an automobile in some embodiments of the present disclosure, from another viewing angle.

As shown in FIG. 1, FIG. 2, and FIG. 10, in one embodiment of the present disclosure, optionally, the first housing 110 and/or the second housing 120 has at least one seventh groove 115. The seventh groove 115 can be used to fix a cable and others for fixing electric devices such as mobile phone.

As shown in FIG. 3, FIG. 4, FIG. 6, and FIG. 7, in the above embodiments of the present disclosure, optionally, the air outlet support 100 further includes a first locking assembly 150. The first housing 110 has a first fixing portion 116, and the rotating part 140 has a second fixing portion 1404. In a locking state, the first locking assembly 150 is between the first fixing portion 116 and the second fixing portion 1404, for limiting relative movement between the rotating part 140 and the first housing 110. The first locking assembly 150 plays a damping role, and facilitates the user in sensing rotation feedback of the rotating part 140, thus improving hand feeling of adjustment, and further improving user experience. Exemplarily, the first locking assembly 150 is connected to the first fixing portion 116 and abuts against the second fixing portion 1404, or the first locking assembly 150 is connected to the second fixing portion 1404 and abuts against the first fixing portion 116.

As shown in FIG. 3, FIG. 4, FIG. 6, and FIG. 7, in the above embodiments of the present disclosure, optionally, the second fixing portion 1404 is provided with a plurality of eighth grooves 14041, and in the locking state, the first locking assembly 150 abuts against the eighth grooves 14041. In this way, the relative movement between the rotating part 140 and the first housing 110 can be further limited, thereby further improving the damping effect, and further improving the hand feeling of adjustment.

As shown in FIG. 3, FIG. 4, FIG. 6, and FIG. 7, in the above embodiments of the present disclosure, optionally, the first fixing portion 116 and the eighth grooves 14041 are provided opposite to each other in the axial direction of the rotating part 140 or opposite to each other in the radial direction of the rotating part 140.

In the present embodiment, when the first fixing portion 116 and the eighth grooves 14041 are provided opposite to each other in the axial direction of the rotating part 140, the eighth grooves 14041 can be provided at an end of the rotating part 140 away from the second housing 120, and through the damping role of the first locking assembly 150, a function of limiting the relative movement between the rotating part 140 and the first housing 110 is realized. When the first fixing portion 116 and the eighth grooves 14041 are provided opposite to each other in the radial direction of the rotating part 140, the first fixing portion 116 is located on an inner circumferential wall of the first housing 110, the eighth grooves 14041 are located on an outer circumferential wall of the rotating part 140, and through the damping role of the first locking assembly 150, the function of limiting the relative movement between the rotating part 140 and the first housing 110 is realized.

As shown in FIG. 3, FIG. 4, FIG. 6, and FIG. 7, in the above embodiments of the present disclosure, optionally, the first locking assembly 150 includes a first elastic part 151 and a first movable part 152. One end of the first elastic part 151 is connected to the first fixing portion 116, the other end of the first elastic part 151 is connected to the first movable part 152, and the first movable part 152 abuts against the eighth grooves 14041. In this way, under the action of the first elastic part 151 and the first movable part 152, the relative movement between the rotating part 140 and the first housing 110 can be limited, and a rotation frictional force between the rotating part 140 and the first housing 110 is increased, thereby playing a damping role, so as to facilitate the user in sensing the rotation feedback of the rotating part 140, improve the hand feeling of adjustment, and improve the user experience.

Figure 22:
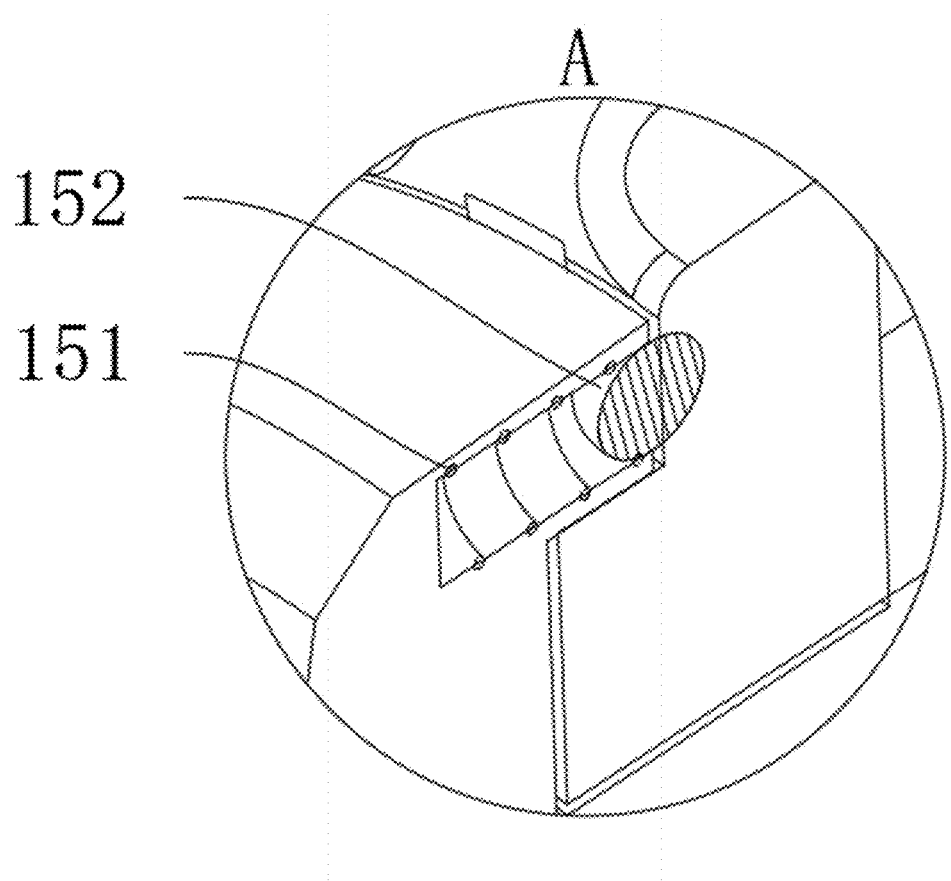
FIG. 22 shows an enlarged schematic diagram of structure of A part in FIG. 7.
Figure 23:
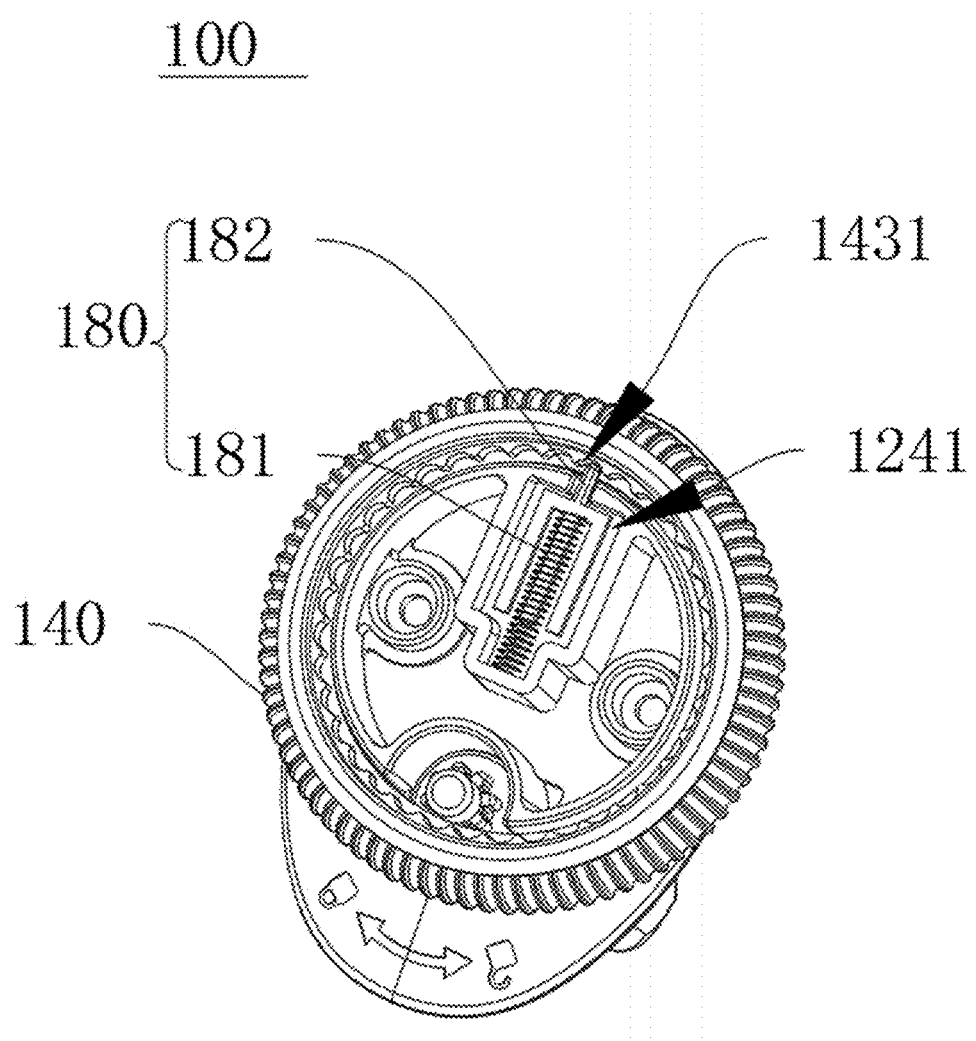
FIG. 23 shows a third perspective schematic diagram of the air outlet support in some embodiments of the present disclosure, from another viewing angle.

Referring to FIG. 22 and FIG. 23 together, exemplarily, the first elastic part 151 is a spring, and the first movable part 152 is a ball or a part in a trident structure.

As shown in FIG. 3, FIG. 4, FIG. 6, and FIG. 7, in the above embodiments of the present disclosure, optionally, the first fixing portion 116 has a ninth groove 1161 configured to accommodate the first elastic part 151.

In the present embodiment, by providing the ninth groove 1161 on the first fixing portion 116 for accommodating the first elastic part 151, so as to realize a function of installing the first elastic part 151, it facilitates assembly, and prevents the first elastic part 151 from dropping from the first fixing portion 116. During installation, the first elastic part 151 and the first movable part 152 are embedded in the ninth groove 1161 in sequence, and a natural length of the first elastic part 151 without bearing an external force is greater than depth of the ninth groove 1161. After installation, the first movable part 152 presses against the first elastic part 151, so that the first elastic part 151 is compressed to generate a resilient force, so that the first movable part 152 abuts against the eighth groove 14041.

As shown in FIG. 3, FIG. 4, FIG. 6, and FIG. 7, in the above embodiments of the present disclosure, optionally, the air outlet support 100 further includes a second locking assembly 160. The second housing 120 has a third fixing portion 1205, and the rotating part 140 has a fourth fixing portion 1405. In the locking state, the second locking assembly 160 is between the third fixing portion 1205 and the fourth fixing portion 1405, for limiting a relative movement between the rotating part 140 and the second housing 120. The second locking assembly 160 has a damping function, and facilitates the user in sensing the rotation feedback of the rotating part 140, thereby improving the hand feeling of adjustment, and improving the user experience. Exemplarily, the second locking assembly 160 is connected to the third fixing portion 1205 and abuts against the fourth fixing portion 1405, or the second locking assembly 160 is connected to the fourth fixing portion 1405 and abuts against the third fixing portion 1205.

As shown in FIG. 3, FIG. 4, FIG. 6, and FIG. 7, in the above embodiments of the present disclosure, optionally, the fourth fixing portion 1405 is provided with a plurality of tenth grooves 14051, and in the locking state, the second locking assembly 160 abuts against the tenth grooves 14051. In this way, the relative movement between the rotating part 140 and the second housing 120 can be further limited, thereby further improving the damping effect, and further improving the hand feeling of adjustment.

As shown in FIG. 3, FIG. 4, FIG. 6, and FIG. 7, in the above embodiments of the present disclosure, optionally, the third fixing portion 1205 and the tenth grooves 14051 are provided opposite to each other in the axial direction of the rotating part 140 or opposite to each other in the radial direction of the rotating part 140.

In the present embodiment, when the third fixing portion 1205 and the tenth grooves 14051 are provided opposite to each other in the axial direction of the rotating part 140, the tenth grooves 14051 can be provided at an end of the rotating part 140 close to the second housing 120, and through the damping role of the second locking assembly 160, a function of limiting the relative movement between the rotating part 140 and the second housing 120 is realized. When the third fixing portion 1205 and the tenth grooves 14051 are provided opposite to each other in the radial direction of the rotating part 140, the third fixing portion 1205 is located on an inner circumferential wall of the second housing 120, the tenth grooves 14051 are located on an outer circumferential wall of the rotating part 140, and through the damping role of the second locking assembly 160, the function of limiting the relative movement between the rotating part 140 and the second housing 120 is realized.

As shown in FIG. 3, FIG. 4, FIG. 6, and FIG. 7, in the above embodiments of the present disclosure, optionally, the second locking assembly 160 includes a second elastic part 161 and a second movable part 162. One end of the second elastic part 161 is connected to the third fixing portion 1205, and the other end of the second elastic part 161 is connected to the second movable part 162. The second movable part 162 abuts against the tenth grooves 14051. In this way, the relative movement between the rotating part 140 and the second housing 120 can be limited under the action of the second elastic part 161 and the second movable part 162, and a rotation frictional force between the rotating part 140 and the second housing 120 is increased, thereby playing a damping role, facilitating the user in sensing the rotation feedback of the rotating part 140, improving the hand feeling of adjustment, and improving the user experience. Exemplarily, the second elastic part 161 is a spring, and the second movable part 162 is a ball.

As shown in FIG. 3, FIG. 4, FIG. 6, and FIG. 7, in the above embodiments of the present disclosure, optionally, the third fixing portion 1205 has an eleventh groove 12051 configured to accommodate the second elastic part 161.

In the present embodiment, by providing the eleventh groove 12051 on the third fixing portion 1205 for accommodating the second elastic part 161, so as to realize a function of installing the second elastic part 161, it facilitates assembly, and prevents the second elastic part 161 from dropping from the third fixing portion 1205. During installation, the second elastic part 161 and the second movable part 162 are embedded in the eleventh groove 12051 in sequence, and a natural length of the second elastic part 161 without bearing an external force is greater than depth of the eleventh groove 12051. After installation, the second movable part 162 presses against the second elastic part 161, so that the second elastic part 161 is compressed to generate a resilient force, and then the second movable part 162 abuts against the tenth grooves 14051.

As shown in FIG. 3, FIG. 4, FIG. 6, and FIG. 7, in the above embodiments of the present disclosure, optionally, the second housing 120 includes a first sub-second housing 121 and a second sub-second housing 122. The first sub-second housing 121 has a seventh through hole 1211, the second sub-second housing 122 has a first through hole 1201 and the third fixing portion 1205, the second sub-second housing 122 partially or completely extends into the seventh through hole 1211, and the first sub-second housing 121 and the rotating part 140 are configured to limit displacement of the second sub-second housing 122 in the axial direction of the rotating part 140.

In the present embodiment, the first sub-second housing 121 is located at an end of the second sub-second housing 122 away from the rotating part 140. The second sub-second housing 122 partially or completely extends into the seventh through hole 1211 of the first sub-second housing 121. The snapping part 130 passes through the first through hole 1201 and the seventh through hole 1211, that is, the second sub-second housing 122 is partially or completely located in a space formed by the first sub-second housing 121 and the first housing 110. The first sub-second housing 121 and the rotating part 140 function to limit and guide the second sub-second housing 122, so as to limit the displacement of the second sub-second housing 122 in the axial direction of the rotating part 140.

As shown in FIG. 3, FIG. 4, FIG. 6, and FIG. 7, in the above embodiments of the present disclosure, optionally, the air outlet support 100 further includes a third locking assembly 170. The first sub-second housing 121 has a fifth fixing portion 1212, and the second sub-second housing 122 has a sixth fixing portion 1221. In the locking state, the third locking assembly 170 is between the fifth fixing portion 1212 and the sixth fixing portion 1221, the fifth fixing portion 1212 and the sixth fixing portion 1221 are provided opposite to each other in the radial direction of the rotating part 140, and the third locking assembly 170 is configured to limit relative movement between the first sub-second housing 121 and the second sub-second housing 122.

In the present embodiment, the third locking assembly 170 is made to connect the sixth fixing portion 1221 and abut against the fifth fixing portion 1212. It is also possible that the third locking assembly 170 is made to connect the fifth fixing portion 1212 and abut against the sixth fixing portion 1221, so that the relative movement between the first sub-second housing 121 and the second sub-second housing 122 is limited by the third locking assembly 170. The third locking assembly 170 plays a damping role. The fifth fixing portion 1212 can be provided on an inner circumferential wall of the first sub-second housing 121, and the sixth fixing portion 1221 can be provided on an outer circumferential wall of the second sub-second housing 122.

As shown in FIG. 3, FIG. 4, FIG. 6, and FIG. 7, in the above embodiments of the present disclosure, optionally, the fifth fixing portion 1212 is provided with a plurality of twelfth grooves 12121, and in the locking state, the third locking assembly 170 abuts against the twelfth grooves 12121. In this way, the relative movement between the first sub-second housing 121 and the second sub-second housing 122 can be further limited, thereby further improving the damping effect. Exemplarily, the third locking assembly 170 includes a third elastic part 171 and a third movable part 172, wherein the third elastic part 171 is a spring, and the third movable part 172 is a ball.

As shown in FIG. 3 and FIG. 4, in the above embodiments of the present disclosure, optionally, the rotating part 140 includes the first rotating portion 1411 and the second rotating portion 1421. The radial distance of the first rotating portion 1411 is greater than that of the second rotating portion 1421, the second rotating portion 1421 has an external thread, the snapping part 130 has a second bent portion 1306, and the second bent portion 1306 is movably connected to the external thread. A direction of the second bent portion 1306 at the movable joint is consistent or substantially consistent with a rotation direction of the external thread at the movable joint.

In the present embodiment, the radial distance of the first rotating portion 1411 is greater than the radial distance of the second rotating portion 1421. The first rotating portion 1411 has an accommodating space 14111, a part of the second rotating portion 1421 is in the accommodating space 14111, and the first rotating portion 1411 is coaxial or substantially coaxial with the second rotating portion 1421, so that when a person screws the first rotating portion 1411 with hand with a relatively small force, the second rotating portion 1421 coaxial or substantially coaxial with the first rotating portion 1411 drives the snapping part 130 to be displaced along the axial direction of the rotating part 140. Meanwhile, the external thread of the second rotating portion 1421 is movably connected to the second bent portion 1306 of the snapping part 130, where a manner of movable connection is that the second bent portion 1306 is provided between two adjacent turns of the outer thread of the second rotating portion 1421. In order to connect the second rotating portion 1421 and the snapping part 130 more firmly, a direction of the second bent portion 1306 is consistent or substantially consistent with the rotation direction of the external thread, and compared with the case where the direction of the second bent portion 1306 is inconsistent with the rotation direction of the external thread at the movable joint, a contact area of the second bent portion 1306 with the second rotating portion 1421 is larger. In this way, when the second rotating portion 1421 and the external thread thereon synchronously rotate along with the first rotating portion 1411, it is easier to realize the function of driving the snapping part 130 to be displaced along the axial direction of the rotating part 140 by using the second bent portion 1306 movably connected to the external thread.

As shown in FIG. 3 and FIG. 4, in the above embodiments of the present disclosure, optionally, the second bent portion 1306 has a thirteenth groove 13061. The thirteenth groove 13061 is configured to accommodate the part between turns of the external thread of the second rotating portion 1421. Therefore, by providing the thirteenth groove 13061, the contact area of the second bent portion 1306 with the second rotating portion 1421 can be effectively increased, and smoothness of axial displacement of the snapping part 130 along the axial direction of the rotating part 140 is improved.

Figure 24:
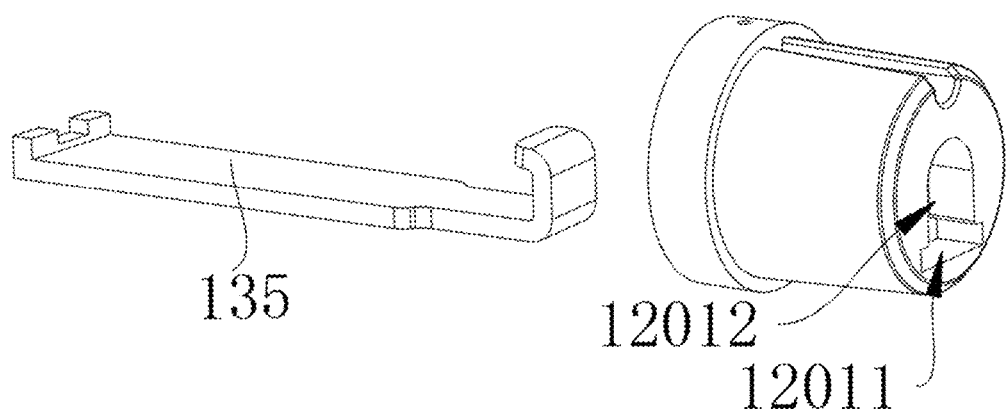
FIG. 24 shows an exploded schematic diagram of the snapping part and the second housing in FIG. 4.

As shown in FIG. 3, FIG. 4, FIG. 5, and FIG. 24, in the above embodiments of the present disclosure, optionally, the snapping part 130 has at least one fourteenth groove 1307, and the fourteenth groove 1307 is at one side of the snapping part 130 close to the first bent portion 1301. Referring to FIG. 24, exemplarily, the first through hole 1201 includes a first sub-first through hole 12011 and a second sub-first through hole 12012. The first sub-first through hole 12011 and the second sub-first through hole 12012 form a "T" shape, and a size of the first sub-first through hole 12011 is matched with that of a base portion 135 of the snapping part 130. During installation, the snapping part 130 passes through the second sub-first through hole 12012, and when the fourteenth groove 1307 moves to the second sub-first through hole 12012, the snapping part 130 is rotated and the snapping part 130 is moved to a predetermined position, so that the snapping part 130 can move in the first sub-first through hole 12011.

Figure 26:
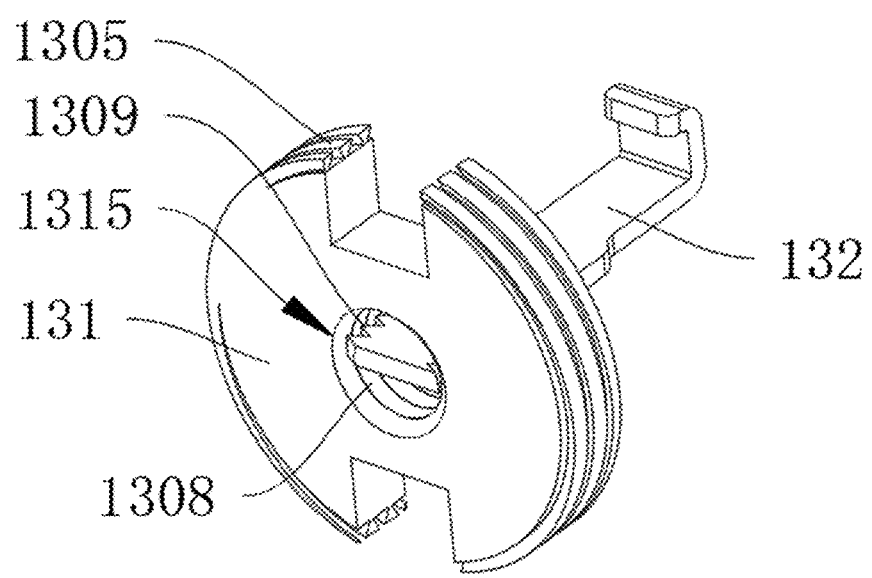
FIG. 26 shows another assembly schematic diagram of a first snapping part and a second snapping part in FIG. 18.

As shown in FIG. 18 and FIG. 26, in the above embodiments of the present disclosure, optionally, the second snapping part 132 passes through the first through hole 1201, the first snapping part 131 has a first threaded portion 1305 and a third threaded portion 1308, the second snapping part 132 has a fourth threaded portion 1309, the third threaded portion 1308 is rotatably connected to the fourth threaded portion 1309, and the first threaded portion 1305 is rotatably connected to the rotating part 140. Through threaded fit, the first snapping part 131 is connected to the second snapping part 132, so that the second snapping part 132 can be displaced along the axial direction of the rotating part 140 along with the rotation of the first snapping part 131.

As shown in FIG. 18 and FIG. 26, in the above embodiments of the present disclosure, optionally, the fourth threaded portion 1309 is an external thread, the first snapping part 131 has an eighth through hole 1315, and the third threaded portion 1308 is an internal thread and is in the eighth through hole 1315. Therefore, through threaded fit, the first snapping part 131 is connected to the second snapping part 132, so that a function that the second snapping part 132 can be displaced along the axial direction of the rotating part 140 along with the rotation of the first snapping part 131 is realized.

As shown in FIG. 18, in the above embodiments of the present disclosure, optionally, the second housing 120 has a first accommodating portion 1206, and an end of the rotating part 140 away from the first housing 110 extends into the first accommodating portion 1206. By screwing the rotating part 140 with one hand, the user can drive the first snapping part 131 to rotate and the second snapping part 132 to move along the axial direction of the rotating part 140, so as to drive the first bent portion 1301 on the second snapping part 132 to move towards the direction close to or away from the second housing 120, thereby realizing the locking and unlocking functions.

Figure 13:
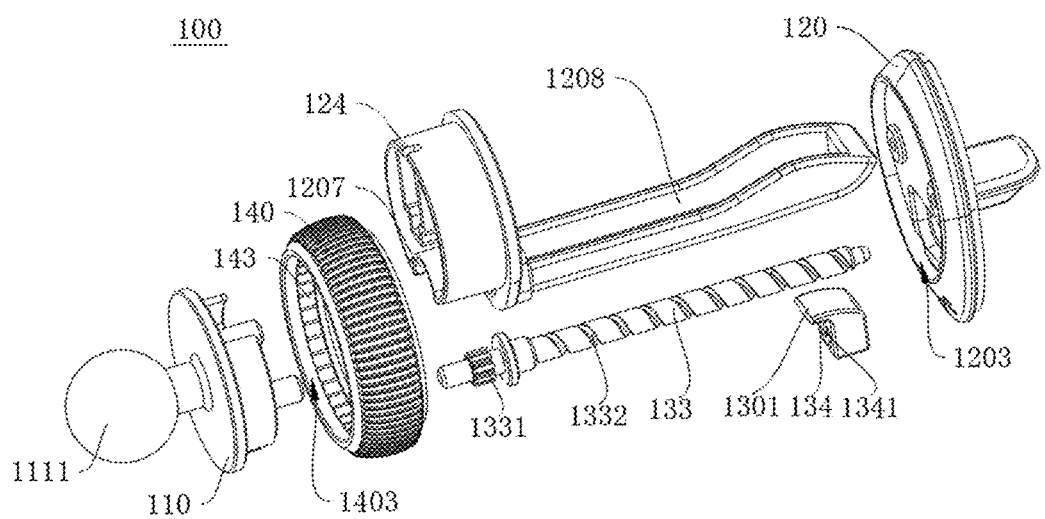
FIG. 13 shows a third exploded schematic diagram of the air outlet support mountable to an air conditioner of an automobile in some embodiments of the present disclosure, from one viewing angle.

As shown in FIG. 12, FIG. 13, and FIG. 14, in one embodiment of the present disclosure, optionally, the snapping part 130 includes a third snapping part 133 and a fourth snapping part 134. The third snapping part 133 is rotatably connected to the fourth snapping part 134, the second housing 120 has a second accommodating portion 1208, an end of the third snapping part 133 close to the rotating part 140 is rotatably connected to the rotating part 140, an end of the third snapping part 133 away from the rotating part 140 extends into the second accommodating portion 1208, and the fourth snapping part 134 has the first bent portion 1301, and can move in the second accommodating portion 1208 along the axial direction of the rotating part 140. Exemplarily, the second housing 120 has a second accommodating portion 1208 and a third accommodating portion 1207. An end of the second accommodating portion 1208 away from the rotating part 140 is provided with a groove 12081 or a through hole 12082. An end of the third snapping part 133 close to the rotating part 140 extends into the third accommodating portion 1207 and is rotatably connected to the rotating part 140. An end of the third snapping part 133 away from the rotating part 140 extends into the second accommodating portion 1208 and extends into the groove 12081 or the through hole 12082 in the second accommodating portion 1208. The fourth snapping part 134 can move in the second accommodating portion 1208 along the axial direction of the rotating part 140. Therefore, by screwing the rotating part 140 with one hand, the user can drive the third snapping part 133 to rotate. Due to the limiting effect of the second accommodating portion 1208, the third snapping part 133 drives the fourth snapping part 134 to move in the second accommodating portion 1208 along the axial direction of the rotating part 140, and further drives the first bent portion 1301 on the fourth snapping part 134 to move towards the direction close to or away from the second housing 120, thereby realizing the locking and unlocking functions.

Optionally, an end of the second accommodating portion 1208 away from the rotating part 140 is provided with a first portion 12083, and an end of the second accommodating portion 1208 close to the rotating part 140 is provided with a second portion 12084. The first portion 12083 has a depth greater than that of the second portion 12084, thereby functioning to guide and limit the grille of the air outlet of the air conditioner of the automobile.

Figure 15:
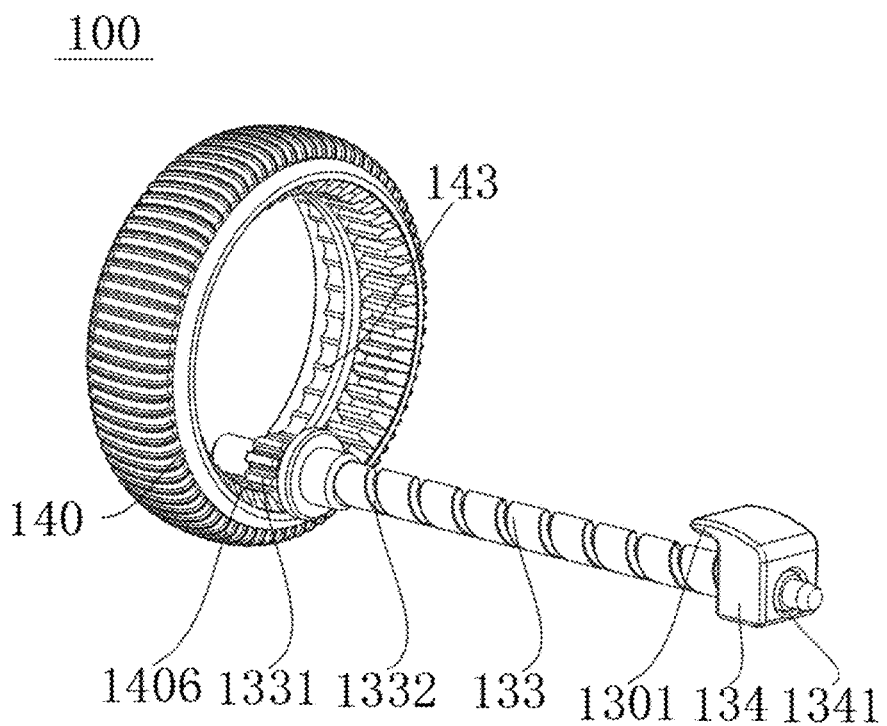
FIG. 15 shows a third perspective schematic diagram of the air outlet support mountable to an air conditioner of an automobile in some embodiments of the present disclosure, from another viewing angle.

As shown in FIG. 13, FIG. 14, and FIG. 15, in the above embodiments of the present disclosure, optionally, an end of the third snapping part 133 close to the rotating part 140 is provided with a first gear portion 1331, and an end of the rotating part 140 close to the third snapping part 133 is provided with a second gear portion 1406. The first gear portion 1331 is meshed with the second gear portion 1406.

An end of the third snapping part 133 away from the rotating part 140 is provided with a fifth threaded portion 1332, the fourth snapping part 134 is provided with a sixth threaded portion 1341, and the fifth threaded portion 1332 is rotatably connected to the sixth threaded portion 1341.

In the present embodiment, by making the first gear portion 1331 of the third snapping part 133 to be meshed with the second gear portion 1406 of the rotating part 140, the user, by screwing the rotating part 140 with one hand, can drive the third snapping part 133 to rotate through gear cooperation between the second gear portion 1406 and the first gear portion 1331. By providing the fifth threaded portion 1332 of the third snapping part 133 rotatably connected to the sixth threaded portion 1341 of the fourth snapping part 134, when the third snapping part 133 rotates, the fourth snapping part 134 is driven to move along the axial direction of the rotating part 140 in the second accommodating portion 1208 through the cooperation between the fifth threaded portion 1332 and the sixth threaded portion 1341, so as to drive the first bent portion 1301 on the fourth snapping part 134 to move towards the direction close to or away from the second housing 120, to realize the locking and unlocking functions.

Exemplarily, the first gear portion 1331 is an external gear, the second gear portion 1406 is a ring gear (annular gear), the fifth threaded portion 1332 is an external thread, and the sixth threaded portion 1341 is an internal thread.

As shown in FIG. 13 and FIG. 23, in the above embodiments of the present disclosure, optionally, the air outlet support 100 further includes a fourth locking assembly 180. The second housing 120 has a seventh fixing portion 124, and the rotating part 140 has an eighth fixing portion 143. In the locking state, the fourth locking assembly 180 is between the seventh fixing portion 124 and the eighth fixing portion 143, for limiting the relative movement between the rotating part 140 and the second housing 120. The fourth locking assembly 180 plays a damping role, and facilitates the user in sensing the rotation feedback of the rotating part 140, thereby improving the hand feeling of adjustment, and further improving the user experience. Exemplarily, the fourth locking assembly 180 is connected to the seventh fixing portion 124 and abuts against the eighth fixing portion 143, or the fourth locking assembly 180 is connected to the eighth fixing portion 143 and abuts against the seventh fixing portion 124.

As shown in FIG. 13 and FIG. 23, in the above embodiments of the present disclosure, optionally, the eighth fixing portion 143 is provided with a plurality of fifteenth grooves 1431, and in the locking state, the fourth locking assembly 180 abuts against the fifteenth grooves 1431. In this way, the relative movement between the rotating part 140 and the second housing 120 can be further limited, thereby further improving the damping effect and the hand feeling of adjustment.

As shown in FIG. 13 and FIG. 23, in the above embodiments of the present disclosure, optionally, the fourth locking assembly 180 includes a fourth elastic part 181 and a fourth movable part 182. One end of the fourth elastic part 181 is connected to the seventh fixing portion 124, the other end of the fourth elastic part 181 is connected to the fourth movable part 182, and the fourth movable part 182 abuts against the fifteenth grooves 1431. In this way, the relative movement between the rotating part 140 and the second housing 120 can be limited under the action of the fourth elastic part 181 and the four movable part 182, and the rotation frictional force between the rotating part 140 and the second housing 120 is increased, thereby playing a damping role, so as to facilitate the user in sensing the rotation feedback of the rotating part 140, improve the hand feeling of adjustment, and improve the user experience.

Exemplarily, the fourth elastic part 181 is a spring, and the fourth movable part 182 is a part in a trident structure.

As shown in FIG. 13 and FIG. 23, in the above embodiments of the present disclosure, optionally, the seventh fixing portion 124 has a sixteenth groove 1241 configured to accommodate the fourth elastic part 181.

In the present embodiment, by providing the sixteenth groove 1241 on the seventh fixing portion 124 for accommodating the fourth elastic part 181, so as to realize a function of installing the fourth elastic part 181, it facilitates assembly, and prevents the fourth elastic part 181 from dropping from the seventh fixing portion 124. During installation, the fourth elastic part 181 and the fourth movable part 182 are embedded in the sixteenth groove 1241 in sequence, and a natural length of the fourth elastic part 181 without bearing an external force is greater than depth of the sixteenth groove 1241. After installation, the fourth movable part 182 presses against the fourth elastic part 181, so that the fourth elastic part 181 is compressed to generate a resilient force, and the fourth movable part 182 abuts against the fifteenth groove 1431.

Figure 25:
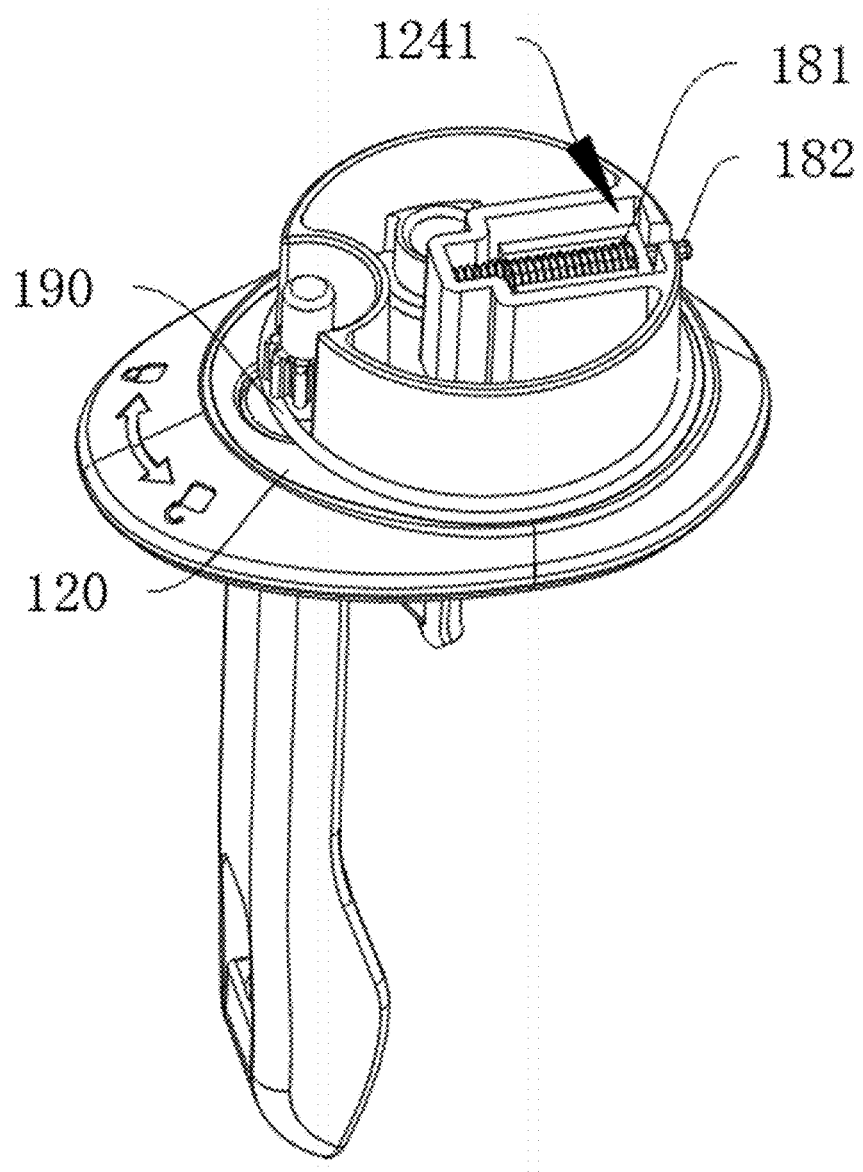
FIG. 25 shows a third perspective schematic diagram of the air outlet support in FIG. 23, with the rotating part being omitted, from another viewing angle.

As shown in FIG. 13 and FIG. 25, in the above embodiments of the present disclosure, optionally, the air outlet support 100 further includes a fifth elastic part 190, and the fifth elastic part 190 is sleeved over the second housing 120 in a circumferential direction of the second housing 120 and abuts between the rotating part 140 and the second housing 120. In this way, the rotation frictional force between the rotating part 140 and the second housing 120 can be further increased, thereby playing a damping role, so as to facilitate the user in sensing the rotation feedback of the rotating part 140, improve the hand feeling of adjustment, and improve the user experience. Exemplarily, a material of the fifth elastic part 190 may be rubber, silica gel, TPU or other materials.

In the description of the present description, description with reference to the terms such as "one embodiment", "some embodiments", "example", "specific example", or "some examples" indicates that specific features, structures, materials or characteristics described with reference to the embodiment or example are contained in at least one embodiment or example of the present disclosure. In the present description, exemplary expressions of the above terms do not necessarily refer to the same embodiment or example. Moreover, the specific features, structures, materials or characteristics described can be combined in any appropriate manner in any one or more embodiments or examples. Besides, a person skilled in the art could compound and combine different embodiments or examples and features of different embodiments or examples described in the present description, without conflict.

Although the embodiments of the present disclosure have been shown and described in the above, it could be understood that the above embodiments are exemplary, and should not be construed as limitation to the present disclosure, and those ordinarily skilled in the art could change, modify, substitute, and vary the above embodiments within the scope of the present disclosure.

What is claimed is:

1. An air outlet support mountable to an air conditioner of an automobile, comprising:
 a first housing:
 a second housing, connected to the first housing and having a first through hole:

a snapping part, penetrating through the first through hole and having a first bent portion; and a rotating part, rotatably arranged between the first housing and the second housing and movably connected to the snapping part, wherein when the rotating part rotates, the snapping part is displaced along an axial direction of the rotating part, and the first housing and the second housing are configured to limit the rotating part from displacing in the axial direction of the rotating part;

wherein the first housing and the second housing form an accommodating space, and the rotating part is rotatably provided in the accommodating space.

2. The air outlet support mountable to the air conditioner of the automobile according to claim 1, wherein the first housing comprises a first sub-first housing and a second sub-first housing, wherein the first sub-first housing is provided with a first connecting part, and the second sub-first housing is connected to the second housing; and the rotating part is rotatably provided between the second sub-first housing and the second housing.

3. The air outlet support mountable to the air conditioner of the automobile according to claim 1, wherein the first housing is provided a first groove, the rotating part is provided with a first protrusion, and the first protrusion is rotatably provided in the first groove.

4. The air outlet support mountable to the air conditioner of the automobile according to claim 1, wherein the rotating part comprises a first rotating portion and a second rotating portion, wherein a radial distance of the first rotating portion is greater than that of the second rotating portion: the second rotating portion is provided with an external thread; and the snapping part is provided with second grooves or second through holes, wherein the external thread is movably connected to the second grooves or the second through holes.

5. The air outlet support mountable to the air conditioner of the automobile according to claim 4, wherein the second rotating portion extends into the first through hole.

6. The air outlet support mountable to the air conditioner of the automobile according to claim 4, wherein the rotating part comprises a first rotating part and a second rotating part, wherein the first rotating part is provided with the first rotating portion, the second rotating part is provided with the second rotating portion, and the first rotating part is detachably connected to the second rotating part.

7. The air outlet support mountable to the air conditioner of the automobile according to claim 1, wherein the snapping part is rotatably connected to the rotating part.

8. The air outlet support mountable to the air conditioner of the automobile according to claim 7, wherein an end of the snapping part facing the rotating part is provided with a first threaded portion, the rotating part is provided with a second threaded portion, and the first threaded portion is rotatably connected to the second threaded portion.

9. The air outlet support mountable to the air conditioner of the automobile according to claim 1, wherein the rotating part has a sixth through hole, and a connecting portion of the first housing and the second housing is partially or completely accommodated in the sixth through hole.

10. The air outlet support mountable to the air conditioner of the automobile according to claim 1, wherein the second housing is provided with at least one second protrusion at an end away from the first housing.

11. The air outlet support mountable to the air conditioner of the automobile according to claim 1, wherein the first housing and/or the second housing has at least one seventh groove.

12. The air outlet support mountable to the air conditioner of the automobile according to claim 1, wherein the air outlet support further comprises a first locking assembly, the first housing is provided with a first fixing portion, and the rotating part is provided with a second fixing portion, wherein in a locking state, the first locking assembly is located between the first fixing portion and the second fixing portion, and configured to limit the rotating part from moving relatively to the first housing.

13. The air outlet support mountable to the air conditioner of the automobile according to claim 1, wherein the air outlet support further comprises a second locking assembly, the second housing is provided with a third fixing portion, and the rotating part is provided with a fourth fixing portion, wherein in a locking state, the second locking assembly is located between the third fixing portion and the fourth fixing portion, and configured to limit the rotating part from moving relatively to the second housing.

14. The air outlet support mountable to the air conditioner of the automobile according to claim 1, wherein the rotating part comprises a first rotating portion and a second rotating portion, wherein a radial distance of the first rotating portion is greater than that of the second rotating portion; and the second rotating portion is provided with an external thread and the snapping part is provided with a second bent portion, wherein the second bent portion is movably connected to the external thread.

15. The air outlet support mountable to the air conditioner of the automobile according to claim 1, wherein the snapping part is provided with at least one fourteenth groove, and the at least one fourteenth groove is located at a side of the snapping part close to the first bent portion.

16. The air outlet support mountable to the air conditioner of the automobile according to claim 8, wherein the second snapping part passes through the first through hole; and the first snapping part is provided with a third threaded portion and the second snapping part is provided with a fourth threaded portion, wherein the third threaded portion is rotatably connected to the fourth threaded portion.

17. The air outlet support mountable to the air conditioner of the automobile according to claim 7, wherein the second housing is provided with a first accommodating portion, and an end of the rotating part away from the first housing extends into the first accommodating portion.

18. The air outlet support mountable to the air conditioner of the automobile according to claim 7, wherein the snapping part comprises a third snapping part and a fourth snapping part, wherein the third snapping part is rotatably connected to the fourth snapping part; the second housing is provided with a second accommodating portion; an end of the third snapping part close to the rotating part is rotatably connected to the rotating part, and an end of the third snapping part away from the rotating part extends into the second accommodating portion; and the fourth snapping part is provided with the first bent portion, and can move in the second accommodating portion along the axial direction of the rotating part.

19. The air outlet support mountable to the air conditioner of the automobile according to claim 7, wherein the air outlet support further comprises a fifth elastic part, and the fifth elastic part is sleeved over the second housing in a circumferential direction of the second housing, and abuts between the rotating part and the second housing.

* * * * *